(12) United States Patent
Hongu et al.

(10) Patent No.: US 10,447,914 B2
(45) Date of Patent: Oct. 15, 2019

(54) IMAGING APPARATUS AND CONTROL METHOD, LENS APPARATUS AND CONTROL METHOD, USING SELECTIVE COMMUNICATION METHODS FOR IMPROVED FOCUS ADJUSTMENT

(71) Applicant: CANON KABUSHIKI KAISHA, Tokyo (JP)

(72) Inventors: Hideyasu Hongu, Tokyo (JP); Atsuya Kawanishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/665,521

(22) Filed: Aug. 1, 2017

(65) Prior Publication Data

US 2017/0332005 A1 Nov. 16, 2017

Related U.S. Application Data

(62) Division of application No. 13/900,075, filed on May 22, 2013, now abandoned.

(30) Foreign Application Priority Data

Jun. 6, 2012 (JP) .................................. 2012-128472
Sep. 21, 2012 (JP) .................................. 2012-207842

(51) Int. Cl.
*H04N 5/232* (2006.01)
(52) U.S. Cl.
CPC ..... *H04N 5/23212* (2013.01); *H04N 5/23209* (2013.01); *H04N 5/23245* (2013.01)
(58) Field of Classification Search
CPC ........... H04N 5/23209; H04N 5/23245; H04N 5/23212

(Continued)

(56) References Cited

U.S. PATENT DOCUMENTS 9,001,264 B2 * 4/2015 Watazawa .............. H04N 5/225
348/360
2004/0263674 A1 * 12/2004 Koreki ............... H04N 5/23212
348/345

(Continued)

FOREIGN PATENT DOCUMENTS

CN 101426087 A 5/2009
CN 102016679 A 4/2011
CN 102027411 A 4/2011

OTHER PUBLICATIONS

The above foreign patent documents were cited in a Jul. 22, 2019 Chinese Office Action, a copy of which is enclosed with an English Translation, that issued in Chinese Patent Application No. 201710833096.3.

*Primary Examiner* — Antoinette T Spinks
(74) *Attorney, Agent, or Firm* — Cowan, Liebowitz & Latman, P.C.

(57) ABSTRACT

An imaging apparatus, to which a lens apparatus can be attached, includes an imaging unit that executes charge accumulation in synchronization with a reference signal and generates an imaging signal, a control unit that controls the data communication with an attached lens apparatus and executes focus detection by using data received from the lens apparatus. The control unit executes data communication with the lens apparatus in a first communication mode in which predetermined data is periodically communicated in synchronization with the reference signal. When a predetermined operation that instructs preparation for still image shooting is being carried out by a user, the control unit changes the first communication mode to a second communication mode in which the control unit executes data communication with the lens apparatus out of synchronization with the reference signal.

25 Claims, 18 Drawing Sheets

(58) Field of Classification Search
USPC ........................................................ 348/345
See application file for complete search history.

(56) References Cited

U.S. PATENT DOCUMENTS

| | | | | |
|---|---|---|---|---|
| 2008/0199170 | A1* | 8/2008 | Shibuno | G02B 7/102 |
| | | | | 396/125 |
| 2011/0044678 | A1* | 2/2011 | Ogino | G02B 7/38 |
| | | | | 396/124 |
| 2011/0044682 | A1* | 2/2011 | Kawanami | G03B 17/14 |
| | | | | 396/439 |
| 2011/0080488 | A1* | 4/2011 | Okamoto | G03B 17/14 |
| | | | | 348/220.1 |
| 2011/0110656 | A1* | 5/2011 | Hamada | G03B 13/36 |
| | | | | 396/133 |
| 2011/0267524 | A1* | 11/2011 | Lee | H04N 5/23212 |
| | | | | 348/333.01 |
| 2013/0011130 | A1* | 1/2013 | Kamimura | G03B 9/62 |
| | | | | 396/452 |
| 2013/0141609 | A1* | 6/2013 | Watazawa | G03B 17/14 |
| | | | | 348/222.1 |
| 2013/0271637 | A1* | 10/2013 | Park | H04N 5/23216 |
| | | | | 348/333.11 |
| 2014/0036111 | A1* | 2/2014 | Kao | H04N 5/23212 |
| | | | | 348/240.1 |
| 2018/0152621 | A1* | 5/2018 | Takinoiri | H04N 5/23212 |

* cited by examiner

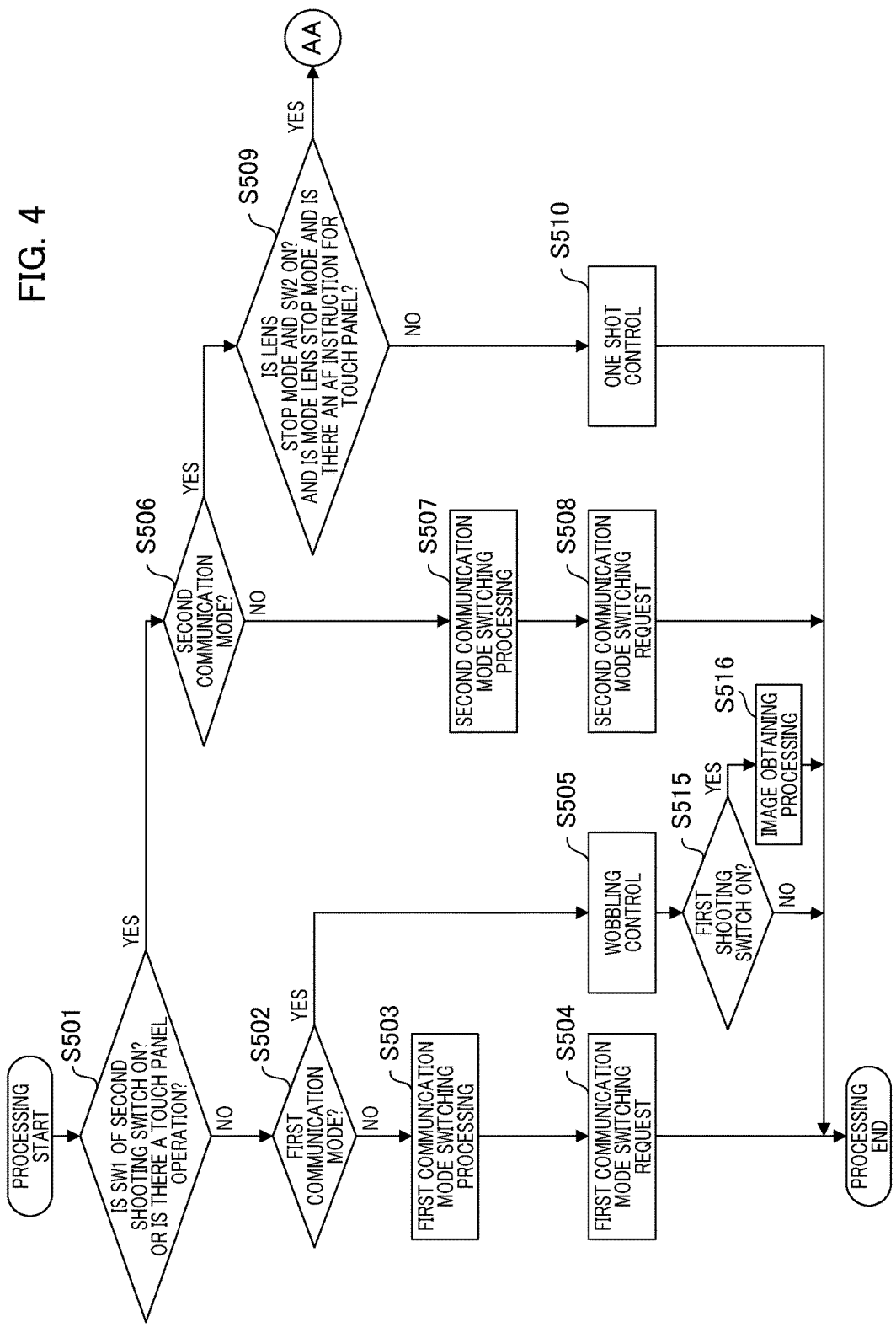

IMAGING APPARATUS AND CONTROL METHOD, LENS APPARATUS AND CONTROL METHOD, USING SELECTIVE COMMUNICATION METHODS FOR IMPROVED FOCUS ADJUSTMENT

CROSS-REFERENCE TO RELATED APPLICATION

This application is a divisional of application Ser. No. 13/900,075, filed May 22, 2013, the entire disclosure of which is hereby incorporated by reference.

BACKGROUND OF THE INVENTION

Field of the Invention

The present invention relates to communication control technology for a lens apparatus and a imaging apparatus.

Description of the Related Art

Among single lens reflex cameras, a film replacement type was typical, but in recent years, digital formats that employ imaging elements that use a CCD (charge coupled device) and CMOS (complementary metal oxide film semiconductor) and the like have come into use. The system configuration of a digital single lens reflex camera resembles that of a video camera, and thus, in recent years, system configurations have been provided that can perform video shooting similar to a video camera.

In Japanese Patent Laid-Open No. 2009-258558, when transmitting high volume information during video shooting from an interchangeable lens to the camera main body, in order to eliminate unnecessary communication from the camera main body to the interchangeable lens, a technology that carries out low speed communication is disclosed. Specifically, in relation to communication between a camera main body and a lens apparatus, clock synchronization therebetween is carried out during still image shooting. In addition, communication from the lens apparatus to the camera main body is carried out by clock synchronization during video shooting, and during communication from the camera main body to the lens apparatus, the communication switches to asynchronous communication, such as a UART communication format and the like. UART is the abbreviation for "Universal Asynchronous Receiver Transmitter". Specifically, the camera main body and the lens apparatus transmit and receive data using a method that mixes a plurality of types of communication formats.

During still image shooting, in order to enable quick photographing at a timing intended by a user, reducing the release time lag is required. Thus, when a user carries out an operation for an imaging start instruction, focusing as quickly as possible is necessary.

In contrast, during video photographing, in order to continuously capture images having a suitable focus and exposure, the actuator inside the interchangeable lens apparatus must operate continuously to carry out the focus drive and aperture drive and the like. Thus, auto focusing (AF) and the like is carried out while frequently monitoring the state of the focus lens and the aperture and the like, and controlling the drive of the actuator is important. For example, when using a wobbling method that detects the focused state by micro-driving a focus lens forward and backward, carrying out charge accumulation for obtaining an AF evaluation value from an image during a drive stoppage of the focus lens is desirable. Thus, the exposure timing of imaging element and the drive timing of the focus lens must be adjusted, and in order to do this, necessary information must be periodically communicated by the camera and the interchangeable lens apparatus.

However, in Japanese Patent Laid-Open No. 2009-258558, a configuration is not disclosed in which information is periodically transmitted and received between a camera main body and an interchangeable lens conforming to the exposure timing of imaging element during video shooting. In addition, in the case of using conventional technology, costs may increase because a plurality of communication units are necessary in order to switch between a plurality of communication formats such as a clock synchronization and UART communication format in accordance with video shooting and still image shooting.

SUMMARY OF THE INVENTION

The apparatus of the present invention enables appropriate communication processing according to the shooting mode between a lens apparatus and a imaging apparatus main body in clock synchronization type communication.

The apparatus of an embodiment of the present invention is an imaging apparatus to which interchanging lens apparatuses can be attached. The imaging apparatus includes an imaging unit configured to execute charge accumulation in synchronization with a reference signal and generates an imaging signal; a control unit configured to control data communication with an attached lens apparatus, and execute focus detection by using data received from the lens apparatus. The control unit executes data communication with the lens apparatus in a first communication mode in which predetermined data is periodically communicated in synchronization with the reference signal. When a predetermined operation that instructs preparation for still image shooting is carried out by a user, the control unit changes the first communication mode to a second communication mode in which the control unit executes data communication with the lens apparatus out of synchronization with the reference signal.

According to the apparatus of the present invention, in clock synchronization type communication, appropriate communication processing can be carried out depending on the photography mode between the lens apparatus and the photography apparatus main body.

Further features of the present invention will become apparent from the following description of exemplary embodiments with reference to the attached drawings.

BRIEF DESCRIPTION OF THE DRAWINGS

FIG. 4 is a flowchart for explaining an example of communication switching processing that is carried out by the camera main body in order to explain a first embodiment of the present invention along with FIG. 6 to FIG. 14.

DESCRIPTION OF THE EMBODIMENTS

Below, each of the embodiments of the present invention will be explained in detail based on the appended drawings. Note that the present invention can be applied to a photography apparatus and the like that includes a main body portion to which a lens apparatus can be attached, as in a digital single lens reflex lens camera.

First Embodiment

Figure 1:
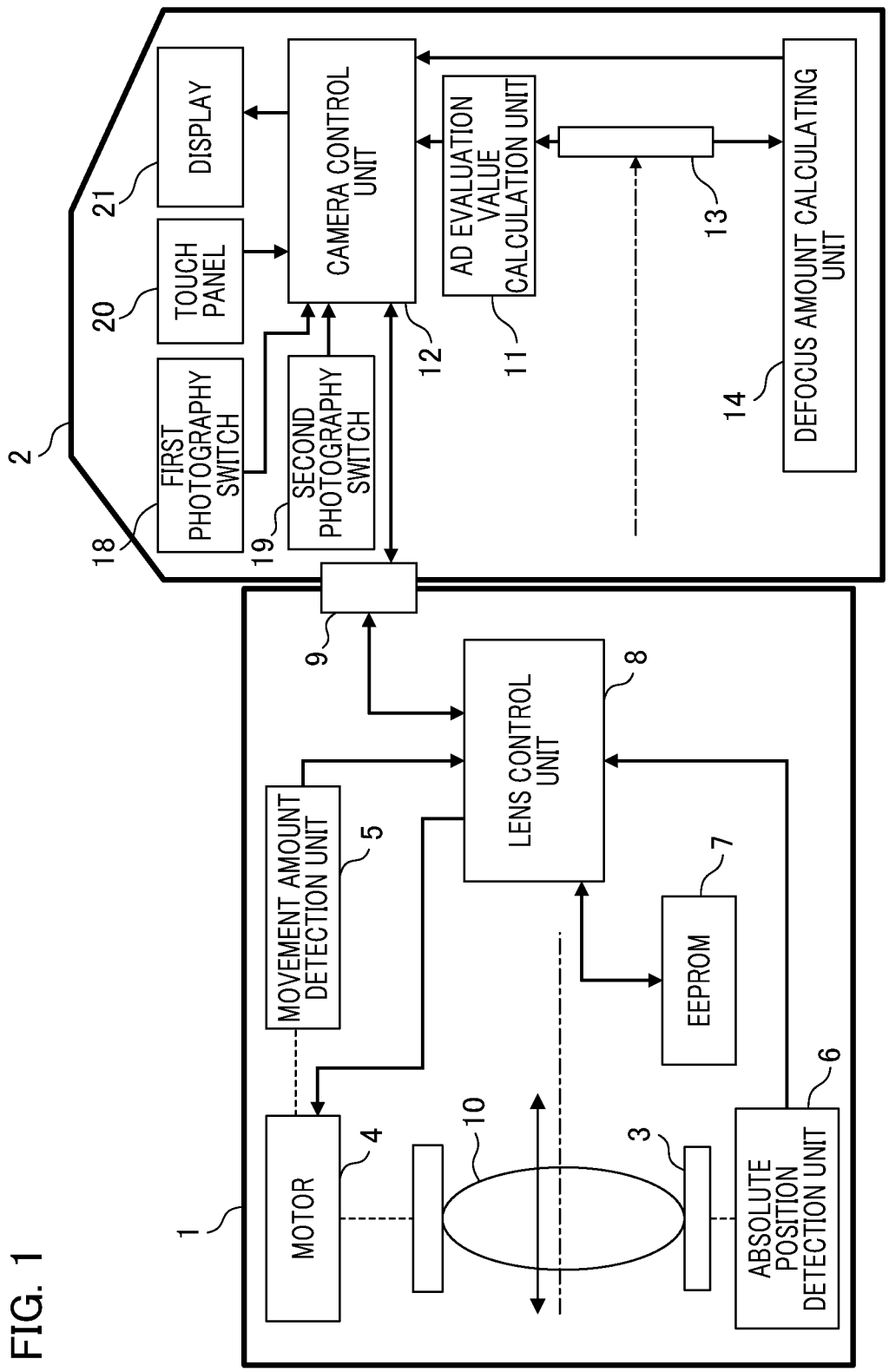
FIG. 1 is a block diagram that shows an example of a configuration of a camera main body and an interchangeable lens unit according to an embodiment of the present invention.

FIG. 1 is a block diagram that exemplifies the configuration of an imaging apparatus and a lens apparatus according to a first embodiment of the present invention. In FIG. 1, an example of an internal configuration of an interchangeable lens unit 1 and a camera main body 2 are schematically shown. The interchangeable lens unit 1 is an interchangeable autofocus lens, and is provided with a focus unit 3. The focus unit 3 is an optical unit that configures an imaging optical system. In FIG. 1, the illustration of other optical members such as a zoom lens and the like is omitted. In addition, FIG. 1 illustrates a focus lens 10 as having one lens, but the focus lens 10 may be configured by a plurality of lenses. The focus unit 3 is provided with a drive mechanism that supports the focus lens 10 so as to be movable along an optical axis direction of the imaging optical system, and for focusing on an object. The motor 4 is an actuator for driving the focus unit 3, and drive control is carried out according to the control instruction of the lens control unit 8. In the motor 4, an electromagnetic type, an ultrasound type, or a voice coil type motor can be used, and in the present embodiment, an electromagnetic type is used.

A movement amount detecting unit 5 outputs a detection signal to a lens control unit 8 after detecting the rotation amount and the rotation speed of a motor 4. The movement amount detecting unit 5 is provided with a round plate (not illustrated), a light emitting element such as an LED, and a light receiving element. The round plate includes notched portions that are formed at the same pitch along the circumferential direction, and rotates in synchronization with the rotation of the motor 4. A change in the signal is detected according to a state in which the light that has been emitted from the light emitting elements arrives at a light receiving element after passing through the round plate and a state in which the light that has been emitted from the light emitting elements is blocked by the round plate. Because the movement amount of the focus lens 10 is proportional to the rotation amount of the motor 4, the movement amount of the focus lens 10 can be measured by detecting the rotation amount of the motor 4. An absolute position detecting unit 6 detects the absolute position of the focus lens 10, and outputs a detection signal to the lens control unit 8. The absolute position detecting unit 6 detects a change in the signal due to conduction between a plurality of metal brushes that move in conjunction with the focus lens 10 and a fixed metal pattern. Based on this signal change, the current position of the focus lens 10 can be detected.

An EEPROM (Electrically Erasable Programmable Read-Only Memory) 7 that configures a memory unit is a rewritable non-volatile memory, and stores adjustment data for the interchangeable lens unit 1 and the like. The lens control unit 8 controls each unit in the interchangeable lens unit 1. The lens control unit 8 includes a communication controller for carrying out bidirectional communication with a camera main body 2; a reset exception process function, A (analog)/D (digital) conversion function; a timer function; input and output port control function; and a memory function using ROM and RAM and the like. ROM is "read only memory", and RAM is "random access memory".

The contact device 9 is a connection device for carrying out communication between an interchangeable lens unit 1 and the camera main body 2. The contact unit 9 has a plurality of metal contacts, and electrically connects the lens control unit 8 and the camera control unit 12. The plurality of metal contacts include a plurality of metal projections that are provided on the camera main body 2 side and a plurality of metal pieces that are provided on the interchangeable lens unit 1 side. While the interchangeable lens unit 1 is attached to the camera main body 2, the plurality of metal projections and the plurality of metal pieces brought into mechanical contact to form a contact. This contact also includes an electric power supply function in which electric power is supplied from the camera main body 2 to the interchangeable lens unit 1.

Next, the configuration of the camera main body 2 will be explained. An imaging element 13 generates an imaging signal by photoelectrically converting light flux that passes through the imaging optical system. An AF evaluation value calculating unit 11 calculates evaluation values that are used in the autofocus (AF) adjustment based on the imaging signals that have been generated by the imaging element 13. In this calculation process, a method is used that calculates the AF evaluation value (focus signal) by extracting the high frequency component of the image from the imaging signal and digitizing the high frequency component. In the case of this method (the contrast AF method), the AF evaluation value becomes larger as the contrast (sharpness) of the captured image becomes higher, and the position that becomes the peak is determined to be the focused position of the focus lens.

The camera control unit 12 controls each unit inside the camera main body 2. The camera control unit 12 includes a communication controller for carrying out bidirectional communication with the lens control unit 8; A/D conversion, current detection function, and timer function; an electric power supply unit that supplies electric power to the lens unit; input-output port control function; and a memory function using ROM and RAM and the like. Note that figures and explanations of the signal processing circuits and the like that process the output signals of the imaging element 13 have been omitted.

The operation units that are used for user operations are provided with various switches and a contact detection apparatus. FIG. 1 illustrates a first shooting switch 18, a second shooting switch 19, and a touch panel 20. The first shooting switch 18 or a first operation area on a touch panel 20 and display 21 are a first operation device by which the user instructs an apparatus to start or end video shooting. In addition, a second shooting switch 19 or a second operation area on the touch panel 20 and the display 21 are a second operation device by which a user instructs the apparatus to perform still image shooting. During an operation by the user, an operation signal is sent to the camera control unit 12.

The touch panel 20 is a thin film sensor that is disposed on the surface of the display 21, and when a user's finger or a stylus or the like contacts this surface, coordinate information on the display 21 is transmitted to the camera control unit 12. Note that the detection method for a touch panel 20 includes a static electricity method and a resistance film method and the like. The display 21 is a display apparatus that displays information about the camera control unit 12 and image information. The display of images that have been captured by the imaging element 13, menu information, warning information, and information in the camera control unit 12 are provided to a user by being displayed on the screen of the display 21. The camera main body 2 is provided with other various functions, but the explanations of these have been omitted. Note that a defocus amount calculating unit 14 is explained in a second embodiment described below, and the explanation thereof is not necessary for the first embodiment.

Next, the AF action and the communication control according to the present application will be explained. First, the AF action of the imaging apparatus will be explained. The camera control unit 12 waits until there is an AF start instruction (an instruction of preparation action for a still image) due to a user operation, and starts the AF action when this instruction has been received. Note that in the case of the present embodiment, there are two methods for an AF start instruction. The first method is a method in which the user operates the second shooting switch 19, which has two positions. In the first position, when the first switch (below, referred to as "SW1") has been turned ON, the AF action starts.

In the present embodiment, using the AF evaluation value that is obtained from the AF evaluation value calculating unit 11, a focus adjustment operation is executed using the contrast AF method. Furthermore, when the user moves a second shooting switch 19 to a second position and the second switch (below, referred to as "SW2") is turned ON, the camera control unit 12 carries out processing that controls the data acquisition operation of the captured image and saves the image data to a recording medium (not illustrated). In addition, a second method for an AF start instruction is a contact detection method that uses the touch panel 20. In the present embodiment, the AF action starts when a user's finger or a stylus or the like contacts a prescribed position on a touch panel 20 that is disposed on the display 21. In addition, when the AF operation is carried out and it is determined that focus has been attained, the camera control unit 12 controls the data acquisition operation of the captured image, and carries out a series of processes for storing the image data to a storage medium (not illustrated). Note that the contact detection method for the touch panel 20 is not limited by the above.

The AF mode can be broadly divided into two modes: a first mode (referred to as the "wobbling control mode") that is generally used during video shooting, and a second mode (referred to as the "one shot control mode") that is generally used during still image shooting. The one shot control mode includes two further modes: a one shot AF mode in which a focus action is carried out only one time, and a servo AF mode in which a focus action is repeated in order to continuously focus on a subject. In addition, the photography modes include a single shooting mode in which image data for one shot is stored when SW2 is ON, and a continuous shooting mode in which image data is continuously stored while SW2 continues being ON. During the live view mode, AF is carried out by using the wobbling control mode, and as described above, when the AF start instruction is made by a user, the AF switches to the AF of the one shot control mode. In this case, the AF start instruction by the user can be stated in other words to be an operation that instructs the switching of the AF mode.

Figure 2:
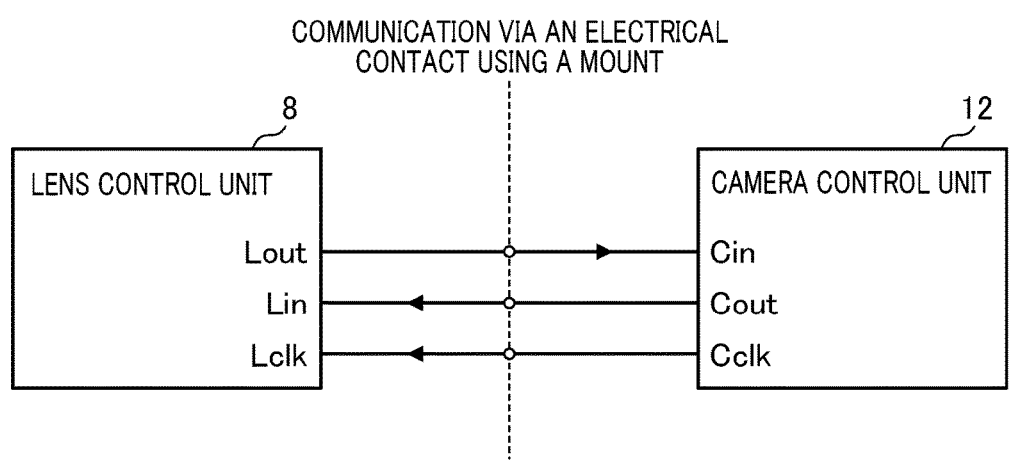
FIG. 2 exemplifies the communication terminals of the camera control unit and the lens control unit.

Next, the communication control process will be explained. First, referring to FIG. 2, communication processing between the lens control unit 8 and the camera control unit 2, which is carried out via the contact unit 9, will be explained. Note that on the left side of FIG. 2, output terminal $L_{out}$, input terminal $L_{in}$, and synchronization clock input terminal $L_{clk}$ of the lens control unit 8 are shown, and on the right side, the input terminal $C_{in}$, the output terminal $C_{out}$, and the synchronization clock output terminal $C_{clk}$ of the camera control unit 12 are shown.

Generally, in communication between the interchangeable lens unit 1 and the camera body 2, both exchange various types of data by a serial communication function provided in each of the control units 8 and 12. The input terminal $L_{in}$ of the lens control unit 8 is a terminal that receives output data from the camera control unit 12. The output terminal $L_{out}$ is a terminal that transmits output data to the camera control unit 12. The synchronization clock input terminal $L_{clk}$ is a synchronization clock input terminal for detecting changes in each signal in the communication of data of $L_{in}$ and $L_{out}$.

The input terminal $C_{in}$ of the camera control unit 12 is a terminal that receives output data from the lens control unit 8. The out terminal $C_{out}$ is a terminal that transmits output data to the lens control unit 8. The synchronization clock output terminal $C_{clk}$ is a synchronization clock output terminal for detecting a change in each of the signals in the communication of each of the data of $C_{in}$ and $C_{out}$. The general name for this communication method is "clock-synchronized serial communication". For example, the camera control unit 12 outputs an 8 cycles clock signal from the synchronized clock output terminal $C_{clk}$. The lens control unit 8 receives this signal at the $L_{clk}$ terminal, and they communicate with each other in synchronization with the clock signal. Information in one-byte (8 bit) units can be sent and received in one communication.

Next, referring to FIG. 3A and FIG. 3B, the first communication mode and the second communication mode for clock-synchronized serial communication in the present embodiment will be explained. Note that in the first communication mode, communication of fixed length data is carried out by using a reference signal for an imaging timing, and in the second communication mode, communication is carried out at an arbitrary timing of the camera without using the reference signal.

Figure 3A:
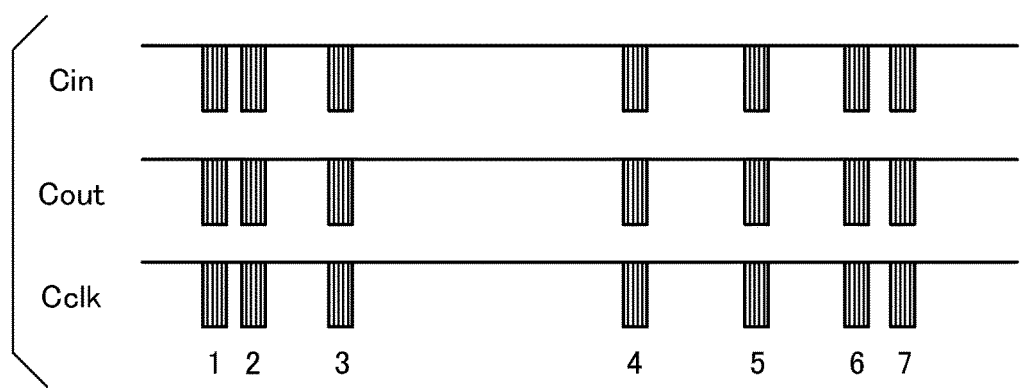
FIG. 3A shows a signal diagram for the second communication mode.

FIG. 3A shows a waveform example of each of the terminals $C_{in}$, $C_{out}$, and $C_{clk}$ of the clock-synchronized serial communication in the second communication mode. In the second communication mode, the camera control unit 12 sends a communication request to the lens control unit 8 at an arbitrary timing, and carries out the sending and receiving of data after synchronization with a clock-synchronized signal that has been output from $C_{clk}$. It is understood that the signals of the terminals $C_{in}$ and $C_{out}$ are changing at a timing corresponding to the signal change of the terminal $C_{clk}$. The communication waveform that is shown in FIG. 3A is an example of a waveform in a state in which a photography mode of a camera is set to the still image shooting mode. The communication timings respectively indicated by numbers 1 to 7 are not synchronized with particular signals, but show that communication is being carried out at an arbitrary timing. During still image shooting mode, control is carried out such that a delay in the timing of the release operation of the photographer does not occur. Specifically, at a time during which a camera operation is not being carried out, the communication interval is made long, and when a release operation is being carried out, simultaneously the communication interval is made short.

Figure 3B:
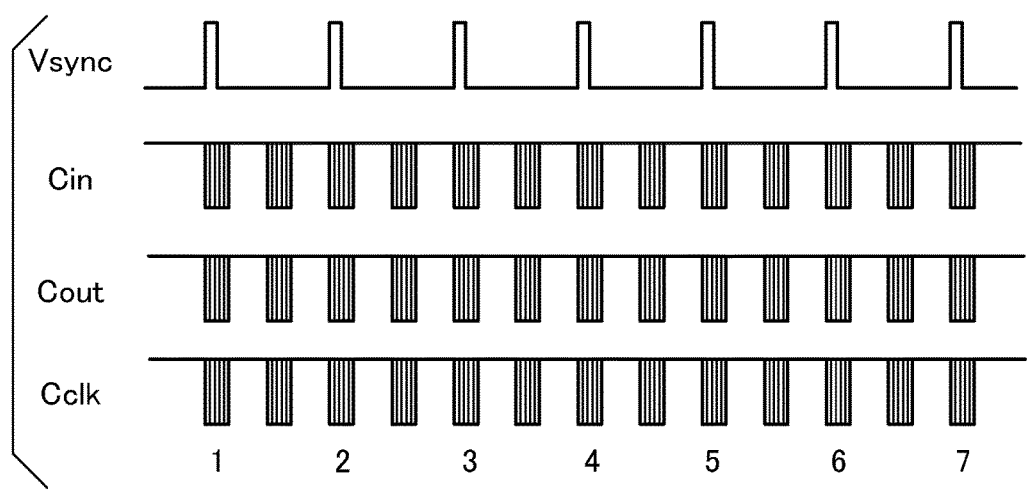
FIG. 3B shows a signal diagram for the first communication mode.

FIG. 3B exemplifies the relationship between examples of waveforms of each of the terminals $C_{in}$, $C_{out}$, and $C_{clk}$ of clock-synchronized serial communication in the first communication mode and the reference signal $V_{in}$. In the first communication mode, the camera control unit 12 and the lens control unit 8 send and receive fixed-length data by synchronizing with the reference signal $V_{sync}$. This $V_{sync}$ signal is a vertical synchronizing signal that represents a timing at which a subject is photographed during video shooting, and the imaging element 13 carries out charge storage in synchronization with the $V_{sync}$ signal. In other words, the $V_{sync}$ signal is a signal that is output in synchronization with the frame rate and indicates a photography cycle. In the present embodiment, a dedicated signal line for transmitting the $V_{sync}$ signal to the lens apparatus is not provided, and the initial falling time of the signal that is output from $C_{clk}$ at each communication time can be transmitted to the lens as a $V_{sync}$ signal.

Specifically, the camera control unit 12 transmits a $V_{sync}$ signal to the lens control unit 8 by using $C_{clk}$. It is understood that the signals of the terminals $C_{in}$ and $C_{out}$ change at a timing that is corresponding to the signal change of the terminal $C_{clk}$. The communication waveform that is shown in FIG. 3B is a waveform example in a state in which the camera is set in the video shooting mode. The communication timings respectively shown with the numerals 1 to 7 are synchronized with the $V_{sync}$ signal. Note that in the present embodiment, two communications of fixed-length data are carried out at 1V (vertical synchronization interval), and the first time communication is carried out by synchronizing with the $V_{sync}$ signal.

Among the two communications, in the first time communication (first communication), the camera control unit 12 receives information about the focus lens position and the arrival determination results, which will be described below, and the like from the lens control unit 8, and executes AF control based on the received information. After executing AF control, in the second time communication (second communication), the camera control unit 12 transmits a drive command for the focus lens to the lens control unit 8. However, even if AF control does not end, if a prescribed time has elapsed since the $V_{sync}$ signal has been output, the second time communication is carried out. In this case, a drive command for a focus lens that is included in the second time communication becomes invalid. In the drive command for the focus lens, information about defocus amount and a drive start time, to be described below, and an arrival estimation time are included.

Generally, the communication interval is a time 1/30 of a second, 1/60 of a second, which is half thereof, of 1/120 second, which is one fourth thereof. The reason is that because the capture action is always repeatedly executed during the video shooting mode, a lens apparatus and a camera main body communicating in synchronization with this imaging timing is desirable in terms of control of a video.

Next, the switching processing for switching between the first communication mode and the second communication mode according to the instructions for starting and ending the AF operation will be explained. FIG. 4 is a flowchart that shows an example of a switching process for communication according to a start instruction of an AF operation in the camera main body. Note that in a standby state until receiving an instruction signal for a user operation by the first shooting switch 18 and the second shooting switch 19, or the touch panel 20, the camera control unit 12 and the lens control unit 8 carry out fixed length data communication in the first communication mode. In this standby state, a live view display may also be carried out in the display 21.

In S501, the camera control unit 12 determines that there is an instruction for still image shooting due to a user operation. In the present embodiment, trigger signals that start the AF operation during still image shooting include two types of operation signals, one for the SW1 of the second shooting switch 19 and one for the touch panel 20. Thus, the camera control unit 12 determines the operational state of a user based on the ON/OFF status of SW1 and contact detection information of the touch panel 20. In the case in which it has been determined that there is no AF start instruction, the processing transfers to S502, and in the case in which it has been determined that there is an AF start instruction, the processing transfers to S506.

In S502, the camera control unit 12 determines whether or not the communication mode is the first communication mode. In the case in which it has been determined that the communication mode is not in the first communication mode, the processing advances to S503, and in the case in which it has been determined that the communication mode is in the first mode, the processing transfers to S505. In S503, switching processing is carried out that switches to the first communication mode, which carries out transmission and reception of fixed length data. Before starting the first communication mode, the camera control unit 12 transmits a drive stop command and the like for the focus lens 10 to the lens control unit 8 in the second communication mode. Next, in S504, a communication switch request to switch to the first communication mode is carried out. In order to start the communication in the first communication mode, the camera control unit 12 transmits a communication switch request to the lens control unit 8, and moves a current mode to the first communication mode. The specific movement processing is not related to the features of the present invention, and thus, their explanations have been omitted.

After transmitting the communication switch request to switch to the first communication mode, the processing ends.

In contrast, in S505, while the first communication mode is established, and the camera control unit 12 executes an AF operation. In the present embodiment, wobbling drive control is carried out that determines a focus position by periodically micro-driving the focus lens 10 toward the near focus side or the infinite focus side. Note that this control is explained below by using FIG. 7 to FIG. 10.

In S515, the camera control unit 12 determines whether or not the first shooting switch 18 is ON. In the case in which the first shooting switch 18 is ON, the processing transfers to S516 in order to start video recording. In the case in which the first shooting switch 18 is OFF, the camera control unit 12 maintains the recording standby state, and ends the processing. In S516, acquisition processing for obtaining video data is executed. The camera control unit 12 processes the image data that has been captured by the imaging element 13, and controls processing in which the video data is continuously transmitted and stored to a recording medium (not illustrated).

When the processing is moved from S501 to S506, the camera control unit 12 determines whether or not the present communication is in the second communication mode. In the case in which the determination result is that the present communication is not in the second communication mode, the processing transfers to S507, and in the case in which the result of the determination is that the present communication is in the second communication mode, the processing transfers to S509. In S507, the camera control unit 12 carries out switching control to switch to the second communication mode. Before starting the second communication mode, the camera control unit 12 transmits a drive stop command and the like for the focus lens 10 to the lens control unit 8 in the first communication mode. Next, in S508, the camera control unit 12 carries out a communication switch request to switch to the second communication mode to the lens control unit 8. Before starting the second communication mode, a communication switch request is transmitted to the lens control unit 8, and the communication mode moves to the second communication mode. The specific movement control is not related to the features of the present invention, and thus, their explanation has been omitted. After transmitting the communication switch request, the processing ends.

Figure 5:
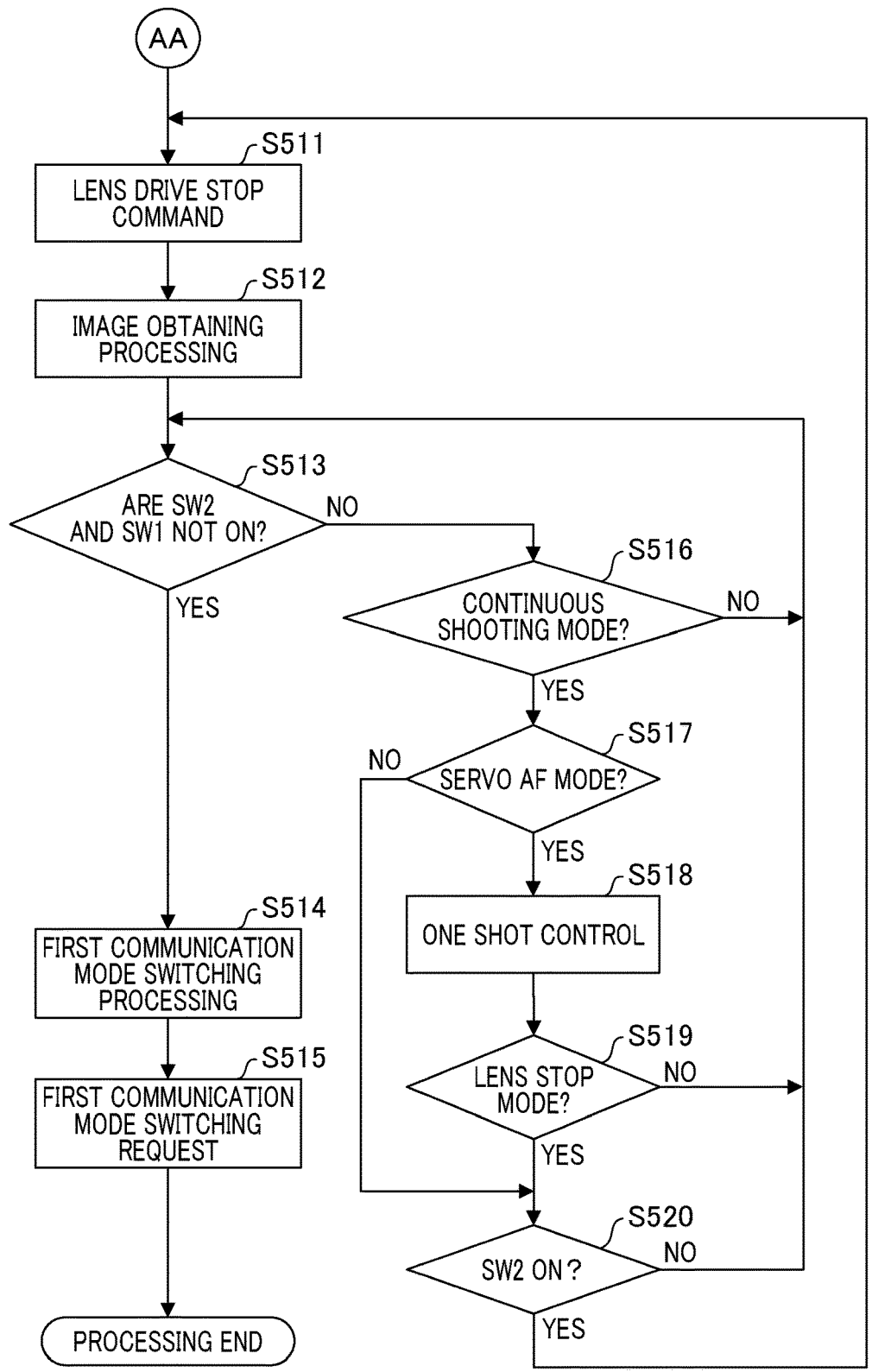
FIG. 5 is a flowchart for explaining the processing subsequent to FIG. 4.

In contrast, in S509, in AF control (one shot control) described below, in a lens stop mode state, the camera control unit 12 determines the action state of SW2 or an action instruction by the touch panel 20. In the case in which the SW2 is ON, or in the case in which AF control has been started by an operation instruction of the touch panel 20, the camera control unit 12 determines that there has been a recording instruction for image data by a user operation, and the processing transfers to S511, which is shown in FIG. 5. In the case in which it has been determined that there is no recording instruction for image data by a user operation, the processing transfers to S510. In S510, because an AF operation start in still image shooting has been requested, focus adjustment control (one shot control) that is suitable for still image shooting is carried out. This control will be explained below with reference to FIG. 12.

In S511 in FIG. 5, the camera control unit 12 transmits a drive stop command for the focus lens to the lens control unit 8. In S512, data of the image that has been captured by the imaging element 13 is obtained, and processing in which the data is sent and stored to a recording medium (not illustrated) is executed.

In S513, the camera control unit 12 determines the presence or absence of an AF instruction. In the case in which SW2 and SW1 are not ON, that is, in the case in which the AF instruction has been cancelled, the processing moves to S514. In addition, in the case in which SW2 or SW1, or SW2 and SW1 are ON, the processing moves to S516. In S514, switching processing to switch to the first communication mode is executed. This is because the first communication mode will continue from the point in time that the AF control for still image shooting has ended until the camera control unit 12 receives the start instruction for the next AF operation. Next, in S515, the camera control unit 12 transmits a communication switch request to switch to the first communication mode to the lens control unit 8, and the processing ends. When the processing ends, the state returns to a standby state, and communication is carried out by using the first communication mode.

In S516, the camera control unit 12 determines whether the photography mode is in the continuous shooting mode or the single shooting mode, and in the case of a continuous shooting mode, moves to S517. In the case in which the photography mode is not a continuous shooting mode, the processing moves to S513, and determination of whether the AF instruction has been cancelled is again carried out.

In S517, the camera control unit 12 determines whether or not the AF mode that has been set is a servo AF mode. As a result of the determination, in the case in which the AF mode is the servo AF mode, the processing moves to S518, and in the case in which this the one shot AF mode, the processing moves to S520. In S518, the camera control unit 12 initializes the state in order to carry out focus adjustment that tracks the movement of the subject, and again starts one shot control from the near focus drive.

In S519, the camera control unit 12 determines whether or not the mode is the lens stop mode in the state of one shot control. As a result of this determination, in the case in which the mode is not the lens stop mode, the processing returns to S513, and the camera control unit 12 continues the one shot control until the focus position of the subject can be determined. In contrast, as a result of the determination, in the case in which the mode is the lens stop mode, the processing moves to S520 so that the focus position can be determined. In S520, the camera control unit 12 determines whether or not the SW2 is ON. As a result of the determination, in the case in which SW2 is ON, the processing moves to S511, and the acquisition processing for image data is executed. In addition, in the case in which SW2 is OFF, the processing moves to S513, and the camera control unit 12 confirms the continuation of the AF instruction.

Note that in the switching processing for the communication modes explained above, the determination of the end of the still image shooting is determined by the state of SW1 or SW2. But this is not limiting, and it may be determined that the still image shooting has ended at the point in time that the acquisition of a specified plurality of images according to the shooting mode has ended, and processing to switch the communication mode may be carried out.

Figure 6:
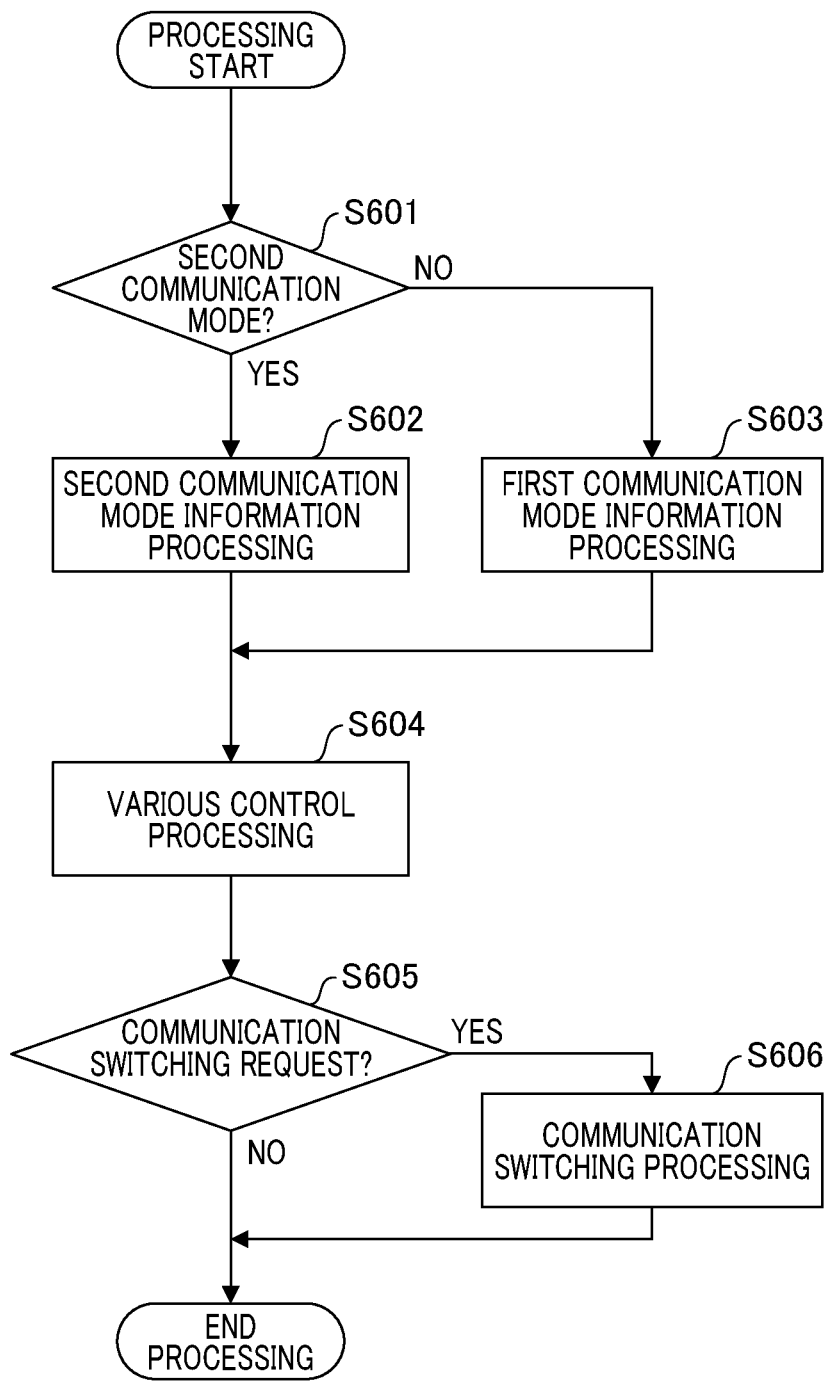
FIG. 6 is a flowchart for explaining an example of communication switching processing that is carried out by the lens apparatus.

Next, referring to the flowchart in FIG. 6, the communication switching processing in the lens control unit 8 will be explained. In S601, the lens control unit 8 determines whether communication being carried out is in the second communication mode or the first communication mode. In the case in which the communication is in the second communication mode, the processing advances to step S602, and processing for the second communication mode is carried out. In contrast, in the case in which the communication is in the first communication mode, the processing advances to step S603, and processing for the first communication mode is carried out.

After S602 and S603, the processing advances to S604, and the lens control unit 8 carries out various types of control processing that include focus control and aperture control according to the received camera information. Next, in S605, the lens control unit 8 determines whether or not a communication switch request has been transmitted from the camera control unit 12 based on an AF start instruction by a user operation. In the case that there is no communication switch request, the processing ends. In the case that there is a communication switch request, the processing advances to S606, and the communication switching processing is executed according to a communication switch request. Note that in the communication processing that is carried out by the lens control unit 8, many other processes and determinations are carried out, but the explanation thereof is omitted.

In the present embodiment, a communication switching process is executed based on an AF start instruction by a user operation. With respect to the AF process in the second communication mode (mainly in the case of still image shooting), communication can be carried out at an arbitrary timing, and thus, the responsiveness is advantageous. In contrast, with respect to AF processing in the first communication mode (mainly the case of video shooting), data necessary for shooting can be transmitted and received in fixed units, and thus, communication efficiency is advantageous. Furthermore, because communication is carried out at a determined periodicity, the drive timing for the lens and the like can be easily controlled, and a stable AF action can be realized.

Furthermore, in the present embodiment, depending on the AF mode and the shooting mode, the timing for switching the communication differs. During the selection of the servo AF mode, because the focus position is quickly determined instead of permitting the occurrence of blur, the movement of the AF evaluation value is monitored and the one shot control is repeatedly carried out. Thereby, during the selection of the servo AF mode, after focusing, in the second communication mode, carrying out control by prioritizing AF control is active.

In addition, in the case in which the single shooting mode is set, at the point in time when the obtaining of image data has ended, the communication mode is switched to the first communication mode, but in the case in which continuous shooting mode is set, the second communication mode is continued while SW2 continues in the ON state. This intends to avoid a delay in the focus time due to the switching of communication occurring during the continuous shooting mode. In addition, the reason for this is that, during the selection of the servo AF mode, continuing to prioritize carrying out AF control in order to continuously determine the focus position is active. In this manner, due to switching processing for the communication configuration suitable for AF mode and shooting mode, AF control that is comfortable for the user can be provided.

Figure 7:
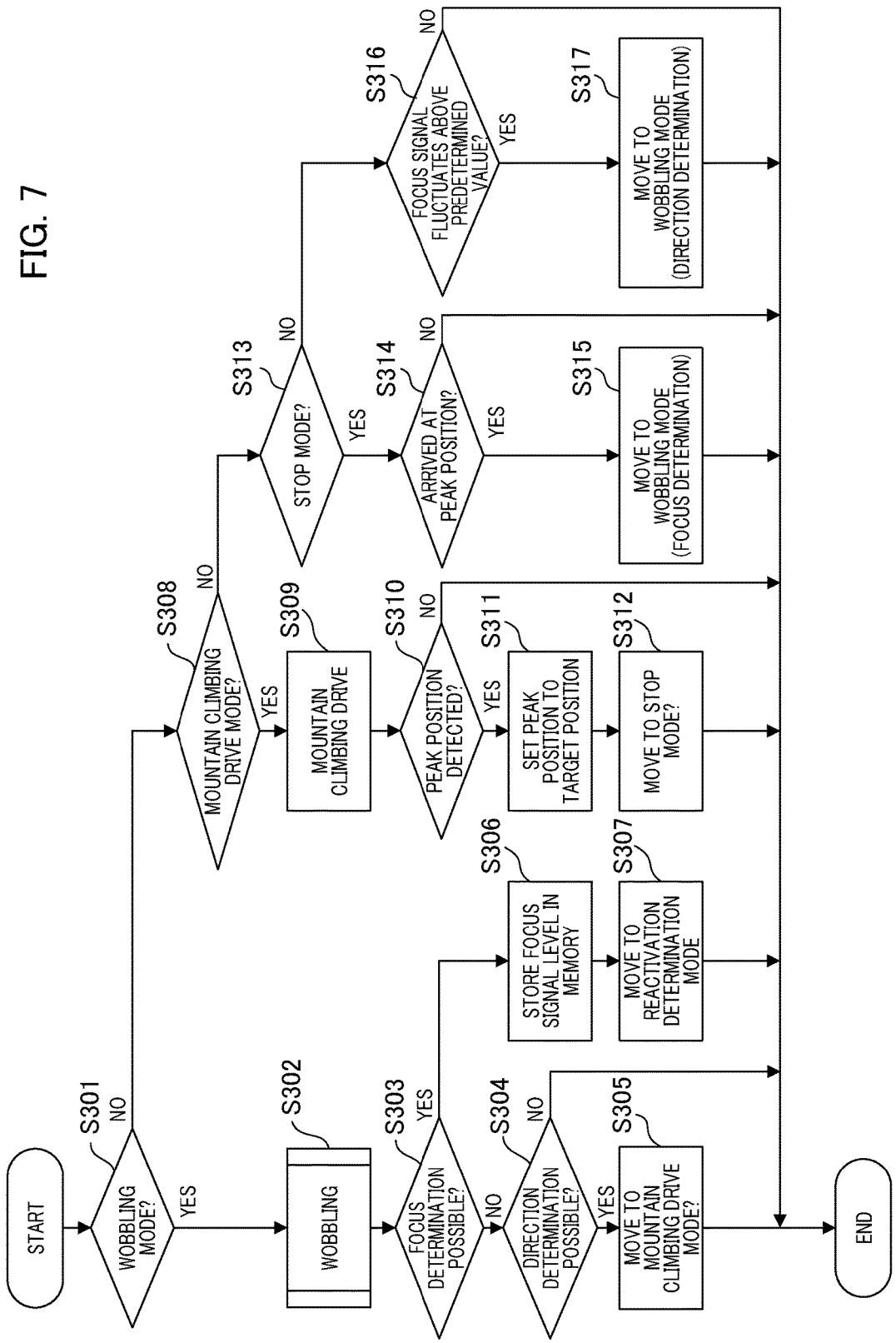
FIG. 7 is a flowchart for explaining an example of wobbling control

Next, an outline of the focus adjustment control by a wobbling action that is carried out by the lens control unit 8 and the camera control unit 12 will be explained by referring to FIG. 7 to FIG. 11. FIG. 7 is a flowchart that exemplifies the overall flow of TVAF control. In TVAF control, a focus signal (AF evaluation value signal) that shows the focus adjustment state is generated based on the imaging signal, and focus adjustment is carried out by searching for a focus position at which the focus signal attains a peak. The processing that is exemplified in FIG. 7 is mainly executed by the camera control unit 12, and the management of the drive and position of the focus lens 10 is carried out through the communication process.

In S301, the camera control unit 12 determines whether or not the mode at the current time is the wobbling mode. In the case in which the mode is the wobbling mode, the processing advances to S302, and in the case in which the mode is not the wobbling mode, the processing advances to S308. In S302, wobbling operation is carried out, and the focus lens 10 is driven by a predetermined amplitude. In S303, determination processing to determine whether the focus lens 10 is in a focused state is carried out, and in S304, determination processing to determine in which direction a focal point is present is carried out. The detailed action thereof is explained below with reference to FIG. 8 and FIG. 11.

In the focus discrimination processing in S303, it is determined whether or not the focus lens 10 is reciprocating within the same area over a predetermined number of times based on the history information of the position of the focus lens 10 due to the wobbling operation in S302. In the case in which a determination result of YES is obtained and it has been determined that focus discrimination has been carried out, the processing moves to S306. In the case in which a determination result of NO is obtained and it has been determined that focus discrimination has not been carried out, the processing moves to S304. In S304, it is determined whether a focal point is present in the same direction continuously over a predetermined number of times based on the history information of the position of the focus lens due to the wobbling operation in S302. In the case in which a determination result of YES is obtained and it has been determined that direction discrimination has been carried out, the processing moves to a mountain-climbing drive mode in S305. In the case in which a determination result of NO has been obtained and it has been determined that direction discrimination has not been carried out, the processing ends. Specifically, the processing returns to S301, and the wobbling operation continues. In S306, after the camera control unit 12 has stored a focus signal level during focusing in memory, the processing advances the processing to S307 and moves to a reactivation determining mode. This re-activation determination mode includes processing (in S316 and S317, described below) that determines whether or not (direction discrimination by) wobbling is carried out again.

In S308, the camera control unit 12 determines whether or not the mode is the mountain-climbing drive mode. In the case in which the mode is the mountain-climbing drive mode, the processing moves to S309, and in the case in which the mode is not the mountain-climbing drive mode, the processing moves to S313. In S309, mountain-climbing drive is executed in which the focus lens 10 is moved at a prescribed speed in a direction in which the focus signal level becomes large. The details of mountain-climbing drive action are well known, and a detailed explanation thereof is omitted. S310 is a determination processing that determines whether or not a peak position of the focus signal by the mountain-climbing drive action in S309 has been detected. In the case in which a position (peak position) at which the focus signal shows a peak has been detected, the processing transfers to S311, and in the case in which a peak position has not been detected, the processing ends. In S311, after a focus lens position at which the focus signal has reached a peak is set as a target position, the processing advances to S312, and processing is ended after moving to the lens stop mode.

In S313, the camera control unit 12 determines whether or not the mode is the lens stop mode. In the case in which the mode is the lens stop mode, the processing moves to S314, and in the case in which the mode is not the lens stop mode, the processing moves to S316. S314 is a determination processing in which it is determined whether or not the focus lens 10 has reached a peak position of a focus signal. In the case in which the focus lens 10 has reached a peak position of the focus signal, the processing moves to S315 and moves to the wobbling (focus discrimination) mode. In addition, in the case in which the position of the focus lens 10 has not reached a peak position, the processing ends and returns to S301, and the lens stop mode continues.

In S316, the camera control unit 12 compares the current focus signal level and the focus signal level that was stored in the memory in S306, calculates the fluctuation amount based on the difference between the two levels, and determines whether or not this is equal to or greater than a predetermined value (threshold value). In the case in which it has been determined that the fluctuation amount is equal to or greater than a threshold value, the processing advances to S317, and moves to wobbling (direction discrimination) mode. In addition, in the case in which the fluctuation amount is less than a threshold value, the processing ends and returns to S301, and the reactivation determination mode is continued.

Figure 8:
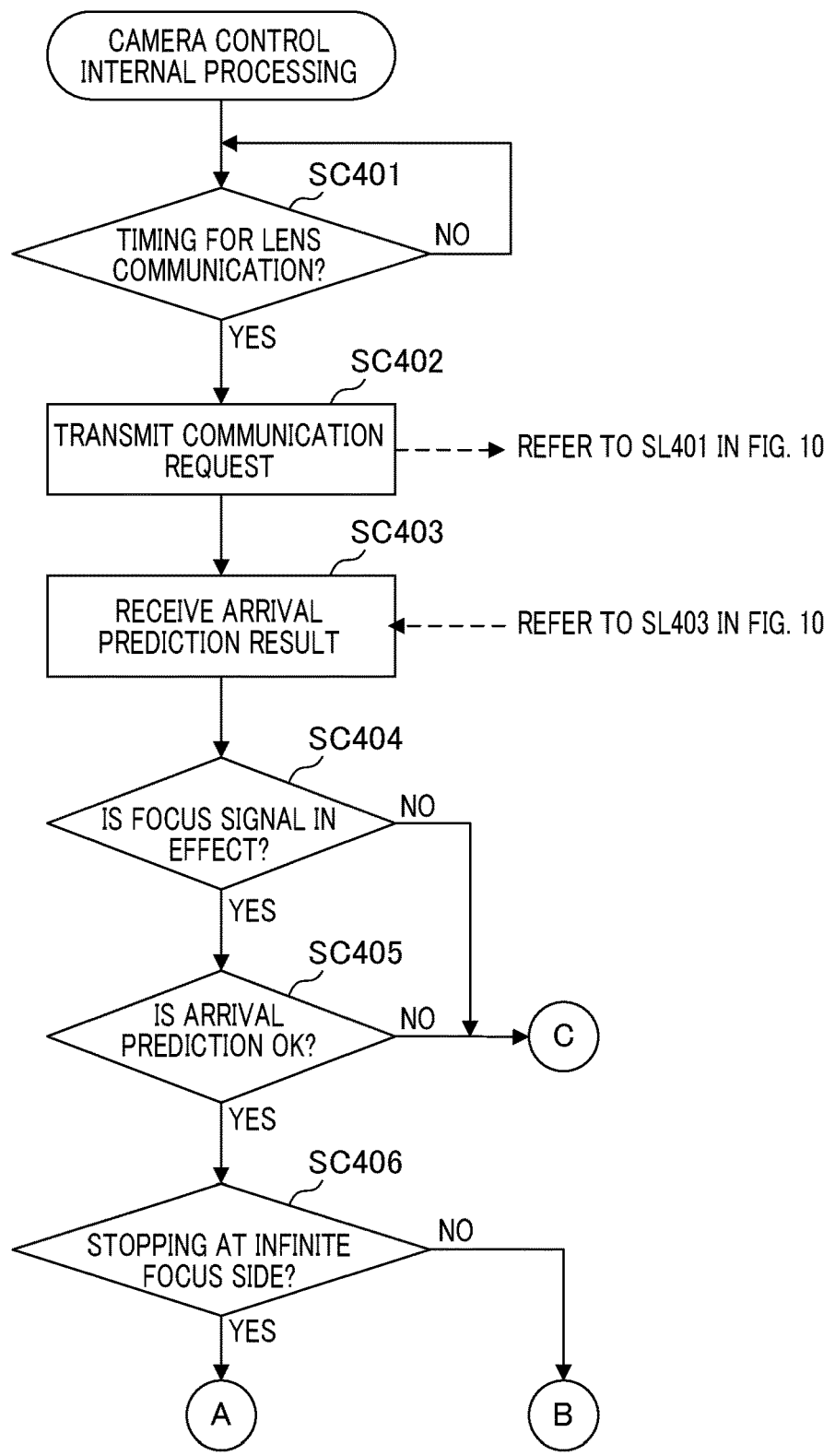
FIG. 8 is a flowchart for explaining an example of processing that is carried out by the camera control unit during wobbling control.
Figure 9:
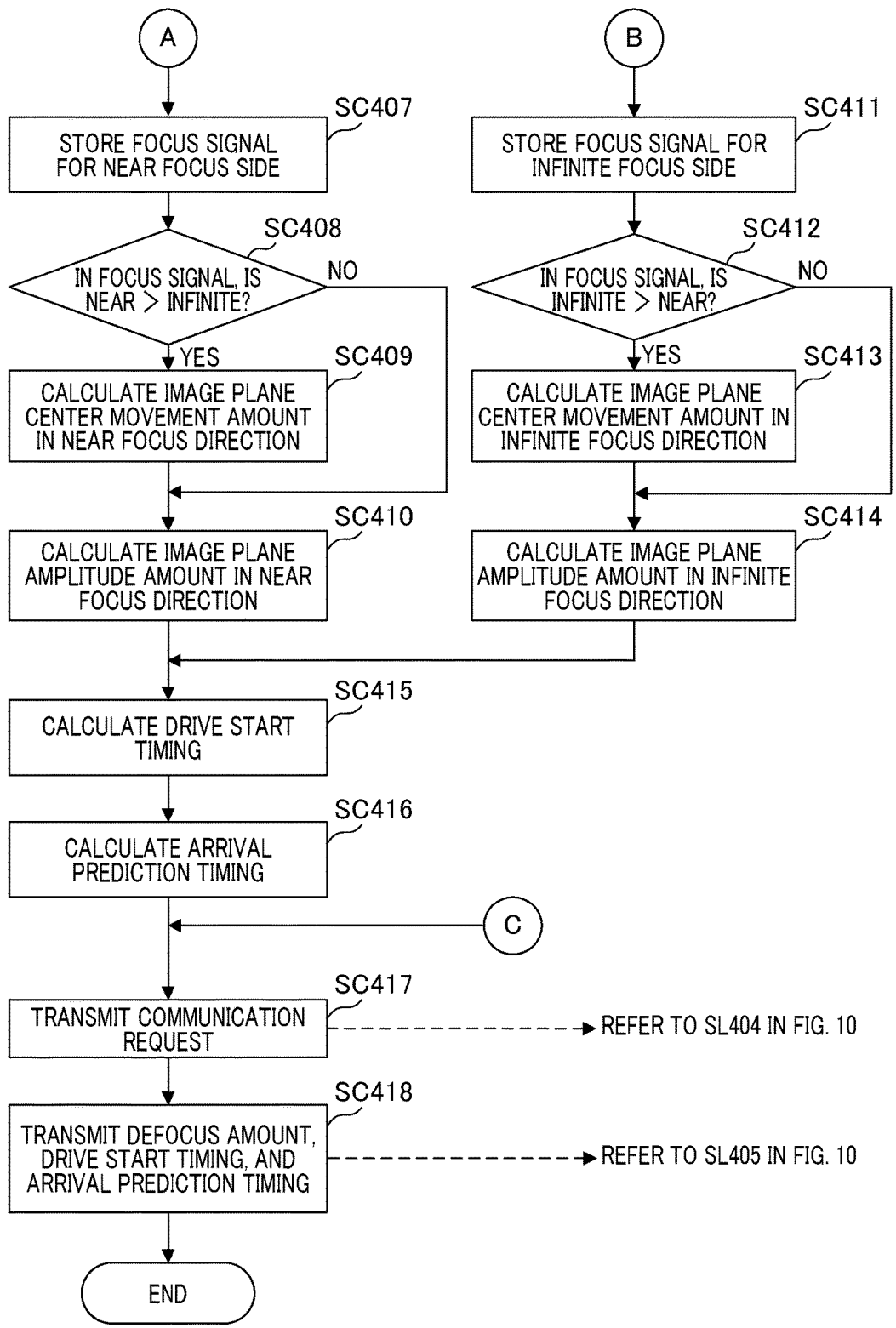
FIG. 9 is a flowchart for explaining processing subsequent to FIG. 8.
Figure 10:
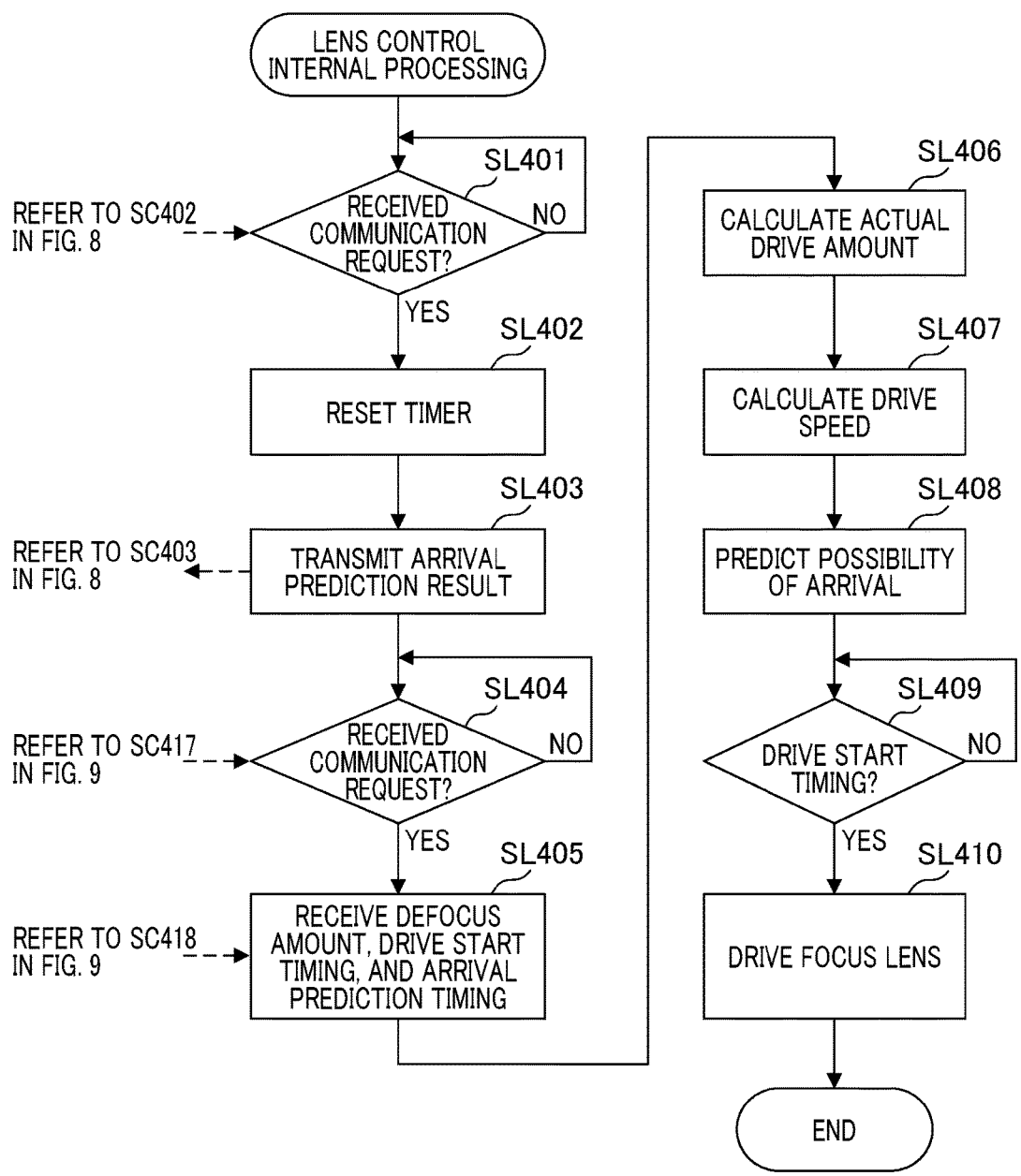
FIG. 10 is a flowchart for explaining an example of processing that is carried out by a lens control unit during wobbling control.
Figure 11:
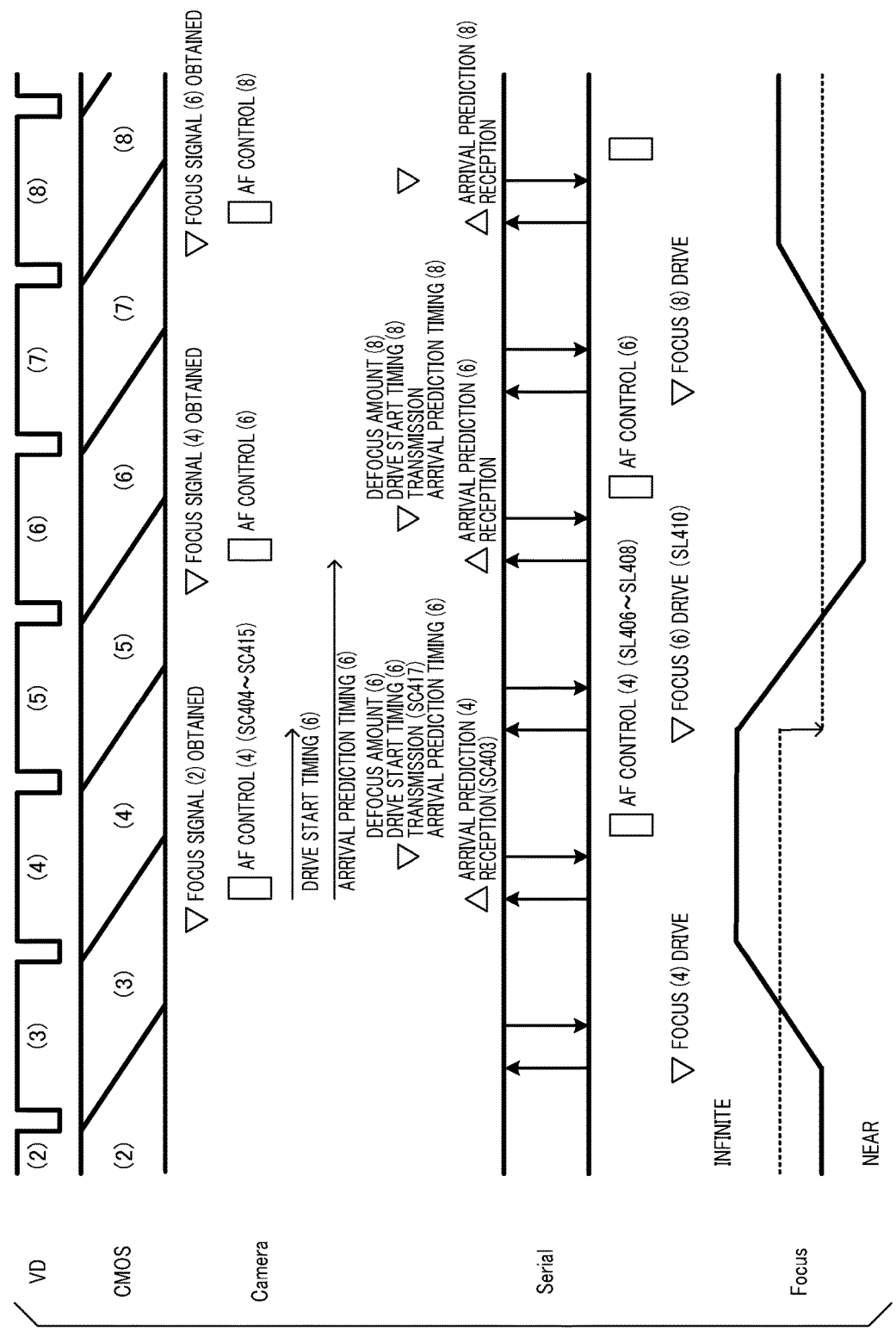
FIG. 11 is a timing chart for explaining an example of wobbling control.

Next, the focus adjustment control during wobbling operation shown in S302 of FIG. 7 will be explained with reference to FIG. 8 to FIG. 11. FIG. 8 and FIG. 9 are flowcharts that show an example of processing for the camera control unit 12. FIG. 10 is a flowchart that shows an example of processing for the lens control unit 8. FIG. 11 exemplifies the signals of each of the units and the communication state. "VD" in FIG. 11 indicates the $V_{sync}$ signal (vertical synchronization signal), "CMOS" indicates the output of the imaging element 13, and "Camera" indicates processing by the camera control unit 12. "Serial" indicates the communication state between the camera control unit 12 and the lens control unit 8, and "Focus" indicates the position change of the focus lens 10.

In SC401 of FIG. 8, it is determined whether or not the current time for the vertical synchronization signal VD of the video matches the predetermined communication time. In the case in which a determination result of YES has been obtained, the processing advances to S402. In addition, in the case in which a determination result of NO has been obtained, the determination processing of SC401 is repeated and a standby state is obtained. The communication time with the lens apparatus can be set to an arbitrary time in which the accumulated time of the imaging signal of the imaging element 13 is set as a reference. However, the delay time with respect to the vertical synchronization signal VD must be constant. In SC402, the camera control unit 12 transmits a communication request to the lens control unit 8, and starts the communication processing.

In contrast, in the processing of the lens control unit 8 shown in FIG. 10, in SL401, it is determines whether or not a communication request transmitted by the camera control unit 12 in SC402 has been received. In the case in which a determination result that has been obtained is YES, the processing advances to SL402, and in the case of a determination result of NO, the determination process of SL401 is repeated. In SL402, triggered by first-time communication starting, the internal timer is reset, and the delay time from the point in time that the communication started is measured by the timer. Next, in SL403, the arrival prediction result calculated in the previous control is transmitted to the camera control unit 12. The content of this arrival prediction will be explained in detail in SL408 below.

Continuing again the explanation of the processing of the camera control unit 12 in FIG. 8, in S403, the camera control unit 12 receives the arrival prediction result that the lens control unit 8 transmitted in SL403. The state at this time will be explained with reference to FIG. 11. The circled numerals in VD and CMOS represent the corresponding times, and in this specification, this is represented by T(x) (where x represents a natural number). In the example in FIG. 11, in the case in which the current point in time of VD is T(4), in the processing of SC403, this corresponds to the time at which the camera control unit 12 receives the arrival prediction result.

In SC404, the camera control unit 12 determines whether or not a focus signal that can be obtained at the present point in time is active. In a determination of whether the focus signal is active, the focus signal is active in the case in which the imaging signal that is the generation origin of the focus signal is not a signal that was accumulated during the driving of the focus lens 10, but is the signal when the focus lens was stopped at a past target position. In the case in which it has been determined that the focus signal is active, the processing advances to SC405, and in the case in which it has been determined that the focus signal is not active, the processing transfers to SC407 in FIG. 9. In the example in FIG. 11, in the case in which the current VD is at time T(4), here, the obtainable focus signal is one that is generated from the imaging signal of VD that was accumulated at T(2). At this time, because the focus lens 10 has stopped at the near focus side, it is determined that the focus signal is active. In addition, in the case in which the current VD is at time T(5), the obtainable focus signal is a signal generated from the imaging signal of VD that was accumulated at T(3). At this time, because the focus lens 10 has moved from the near focus side to the infinite focus side, it is determined that the focus signal is not active.

SC405 is a determination process that determines whether or not the content of the previous arrival prediction result that was received at SC403 is "arrival possible". As an arrival prediction result, in the case in which "arrival possible" is predicted, the processing advances to SC406, and otherwise, the processing transfers to SC417 in FIG. 9. Here, in the case in which the previous arrival result had predicted "arrival not possible", then presently the focus lens 10 is still moving. Thus, because there is a high probability that a sufficient defocussing amount will not be obtained for a focus signal that can be obtained next time, the control cycle for TVAF must be delayed in order to avoid a malfunction. SC406 is a determination process that determines whether or not at the present point in time the focus lens 10 is stopped on the infinite focus side with respect to the center position of the control range. In the case that a determination result of YES has been obtained, the processing advances to SC407 in FIG. 9, and in the case in which a determination result of NO has been obtained, the processing advances to SC411 in FIG. 9. In the example in FIG. 11, in the case in which the current VD is assumed to be at time T(4), it is determined that the focus lens 10 has stopped on the infinite focus side. In addition, in the case in which the current VD is assumed to be at time T(6), it is determined that the focus lens 10 has stopped on the near focus side.

At SC407 of FIG. 9, the camera control unit 12 stores data that shows the focus signal level at the near focus side in memory. In the example in FIG. 11, in the case in which the current VD is assumed to be at time T(4), data of the focus signal level that have been generated from the imaging signal that have been accumulated during the period at which the focus lens 10 was stopped at the near focus side, that is, when VD is at T(2), is stored in memory. In SC408, comparison processing is carried out that compares the focus signal level Lw at the near focus side, which has been stored in memory at S407, and the focus signal level Lt at the infinite focus side, which has been stored in the past in memory at SC411, to be described below. In the case in which Lw>Lt, the processing advances to SC409, and in the case in which Lw≤Lt, the processing transfers to SC410. In the example in FIG. 11, in the case in which the current VD timing is at T(4), the size relationship between the focus signal level Lw at T(2) and the focus signal level Lt (not illustrated) is compared.

In SC409, the camera control unit 12 calculates the amount of movement of the center position, which is the drive center of the focus lens 10, toward the near focus side as the defocus amount on the imaging plane. Normally, this defocus amount is set within the depth of focus. Next, in SC410, the camera control unit 12 calculates the drive amount of the center position of the focus lens 10 in the near side direction as the defocus amount on the imaging plane. This drive amount corresponds to the amplitude when the focus lens 10 is driven, and differs from the movement amount of the drive center position of the focus lens 10. This drive amount, similar to the movement amount of the center position described above, is set within the depth of focus. Then the processing advances to S415.

In contrast, in SC411, the camera control unit 12 stores data that shows the focus signal level at the infinite focus side in memory. In the example in FIG. 11, in the case in which the timing of the current VD is assumed to be at time T(6), data of the focus signal level that is generated from the imaging signal accumulated during the period in which the focus lens 10 has stopped at the infinite focus side, that is, at T(4), is stored in memory. In SC412, comparison processing is carried out that compares the focus signal level Lt at the infinite focus side stored in SC411 and the focus signal level Lw at the near focus side stored in SC407 in the past. In the case in which Lt>Lw, the processing advances to SC413, and in the case in which Lt≤Lw, the processing transfers to SC414. In the example in FIG. 11, in the case in which the timing of the current VD is assumed to be T(6), the size relationship between the focus signal level Lt at T(4) and the focus signal level Lw at T(2) is compared.

In SC413, the camera control unit 12 calculates the movement amount of the drive center position of the focus lens 10 in the infinite focus direction as the defocus amount on the imaging plane. Normally, this defocusing amount is set within the depth of focus. In SC414, the camera control unit 12 calculates the drive amount of the center position of the focus lens 10 in the infinite focus direction as the defocus amount on the imaging plane. Similar to the movement amount of the center position, this defocus amount is also set within the depth of focus. Then, the processing advances to SC415.

In SC415, in order to obtain the defocus amount found in SC409, SC410, SC413, and SC414, the camera control unit 12 calculates the time at which the drive of the focus lens is actually started. This drive start time is generally set by using as a reference the time at which the accumulation of imaging signal by imaging element 13 has completed. Note that in the present embodiment, the drive start time is defined as the delay time from the first communication start time described above. In addition, the drive start time may also be defined by the delay time of the vertical synchronized signal VD. In SC416, the camera control unit 12 calculates the arrival prediction time.

In the case in which the focus lens 10 is driven at the timing indicated in SC415, the timing having the object of predicting whether or not the defocus amount actually found in SC409, SC410, SC413, and SC414 can be obtained is calculated. Specifically, in the arrival prediction time indicated here, whether or not the focus lens 10 can arrive at the target position is predicted. In this arrival prediction time, generally the accumulation start time of the imaging signal of the imaging element 13 is set as a reference. Note that, in the present embodiment, this arrival prediction time is defined by the delay time from the first communication start time described above. In addition, the arrival prediction time may be defined by the delay time of the vertical synchronization signal VD. In SC417, the camera control unit 12 transmits a communication request again to the lens control unit 8, and starts communication processing.

In contrast, in the processing of the lens control unit 8 that is shown in FIG. 10, in SL404, it is determined whether or not the communication request that was transmitted by the camera control unit 12 in SC417 has been received. In the case in which the lens control unit 8 has received the communication request, the processing advances to SL405, and in the case in which the communication request has not yet been received, determination processing return in SL404 is repeated, and maintains a standby state.

When communication is started, in SC418 shown in FIG. 9, the camera control unit 12 transmits data for each of the defocus amount, the drive start time, and the arrival prediction time to the lens control unit 8. The defocus amount is calculated in SC409, SC410, SC413, and SC414. In addition, the drive start time and the arrival prediction time are respectively calculated in SC415 and SC416. In the example of FIG. 11, these correspond to the transmitted times of the defocus amount and the like at T(6) in the case in which the time of the current VD is assumed to be T(4).

In contrast, in SL405 shown in FIG. 10, the lens control unit 8 receives the data for the defocus amount, the start drive timing, and the arrival prediction time that were transmitted by the camera control unit 12 in SC418. In SL406, the actual drive amount of the focus lens 10 is calculated by taking into consideration the sensitivity of the current focus position so that the defocus amount that have been received in SL405 can be obtained.

In SL407, according to the actual drive amount found in SL406, the drive speed of the focus lens 10 is calculated. In SL408, the lens control unit 8 carries out the arrival prediction processing. Specifically, at the drive start time that was received in SL405, the focus lens 10 is driven by the drive speed that was found in SL407. In this case, the actual drive amount at the arrival prediction time that was received in SL405 and the actual drive amount of the focus lens 10 that was found in SL406 are compared, and the arrival possibility is predicted. In the case in which the drive amount of the focus lens 10 can be within the actual drive amount at the arrival prediction time, the arrival prediction result is determined to be "arrival possible", and otherwise, it is determined to be "arrival not possible". Note that next, in SL403, the information that shows this arrival prediction result is transmitted to the camera control unit 12 by the lens control unit 8.

In SL409, the lens control unit 8 refers to the value of the internal timer that has been reset in SL402, and determines whether or not this is the drive start time. In the case in which the delay time from the first communication start time matches the drive start time that was received in SL405, the processing moves to SL410, and otherwise, the processing of SL409 is repeated and a standby state is maintained. In SL410, the actual drive amount found in SL406 and the drive speed that was found in SL407 are set, and the focus lens 10 is actually driven. In the example in FIG. 11, in the case in which the time of the current VD is assumed to be at time T(4), this corresponds to the time at which the drive of the focus lens 10 toward the near focus side actually starts.

As explained above, in the focus adjustment control by the camera control unit 12, the focus lens 10 is driven while repeating the sequence: reactivate determination, wobbling, mountain climbing drive, stop, wobbling, and reactivate determination. Thereby, control is carried out such that the focus signal level is always at a peak, and the focused state is maintained.

Figure 12:
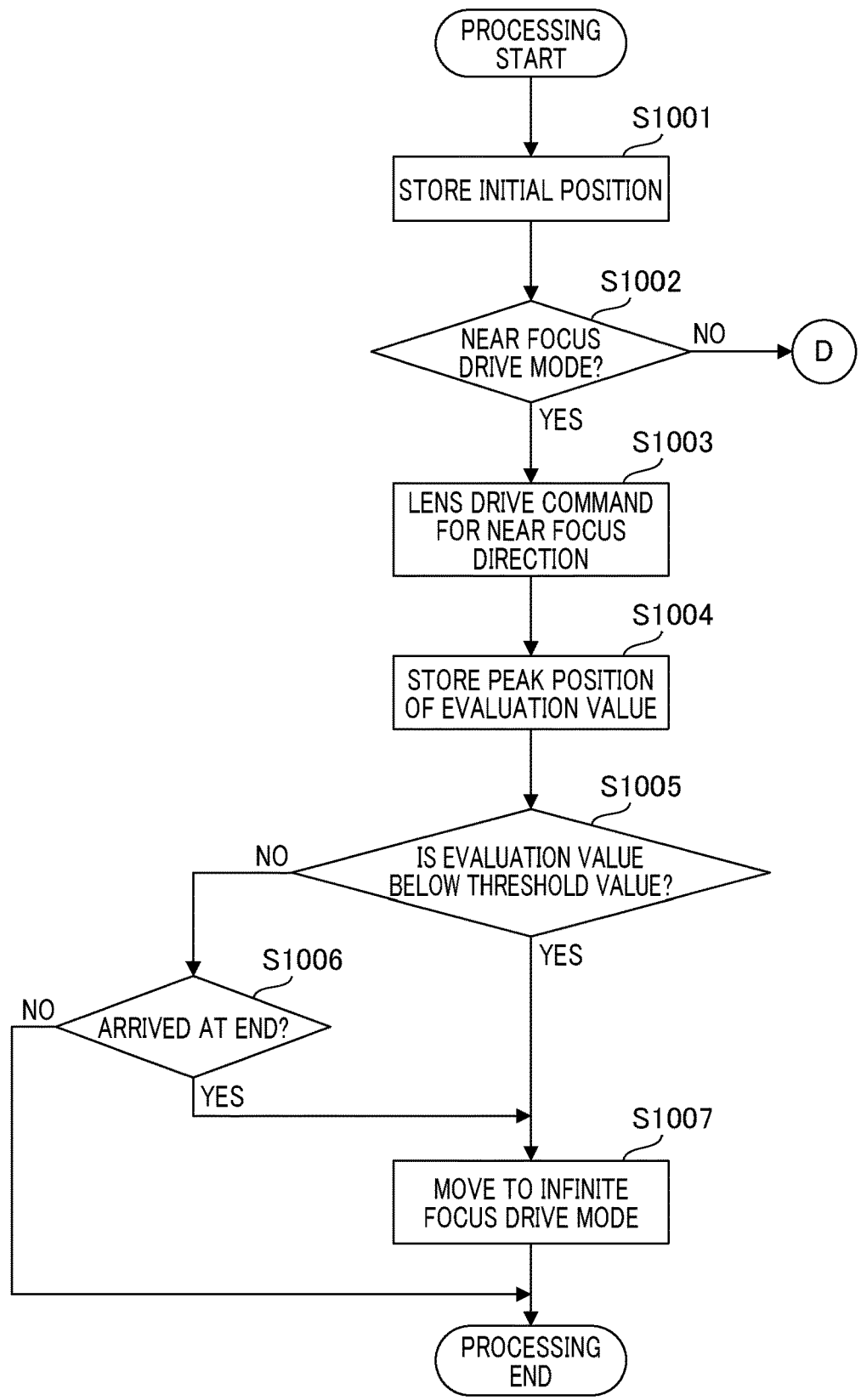
FIG. 12 is a flowchart for explaining one-shot control that is shown in S510 of FIG. 4.

Next, referring to the flowcharts in FIG. 12 and FIG. 13, the one shot control (refer to S510 in FIG. 4) will be explained. Control starts when the camera control unit 12 has received an AF start instruction due to a user operation, and in S1001, the start position of the focus lens is stored in memory. Next, in S1002, it is determined whether or not the drive mode of the focus lens 10 is the near focus drive mode. The near focus drive mode is a mode in which the focus lens 10 moves to the near focus side with respect to the center position of the range of possible movement. In contrast, the mode in which the focus lens 10 is moved to the infinite focus side is the infinite focus drive mode. In the case of the near focus drive mode, the processing transfers to S1003, and in the case of the infinite focus drive mode, the processing transfers to S1008 of FIG. 13.

S1003 is a process in which a lens drive command is transmitted to the lens control unit 8, a drive command is set to drive the lens toward the near focus direction, and then the processing advances to S1004. In S1004, the camera control unit 12 obtains data for an evaluation value according to the sharpness of the captured image from the AF evaluation value calculating unit 11, and stores the data for this evaluation value of the peak and the lens position at this time in memory. In S1005, it is determined whether the current evaluation value has fallen below the evaluation value of the peak that is stored in memory in S1004. In the case in which it is confirmed that the decrease in the evaluation value is equal to or greater than a threshold value, there is a possibility that the focus lens 10 is driven in a direction that is different from the original focus direction. Thus, in order to reverse the drive direction, the processing advances to S1007. In addition, in the case in which the difference between the evaluation value of the peak that was stored in S1004 and the current evaluation value is less than a threshold value, the processing moves to S1006. In S1006, it is determined whether or not the focus lens 10 has arrived at the end of the range of possible movement. In the case in which the focus lens 10 has arrived at the end, the processing moves to S1007 in order to reverse the drive direction, and otherwise, the processing is ended. In S1007, the drive mode of the focus lens 10 is set to the infinite focus drive mode, and the processing is ended.

Figure 13:
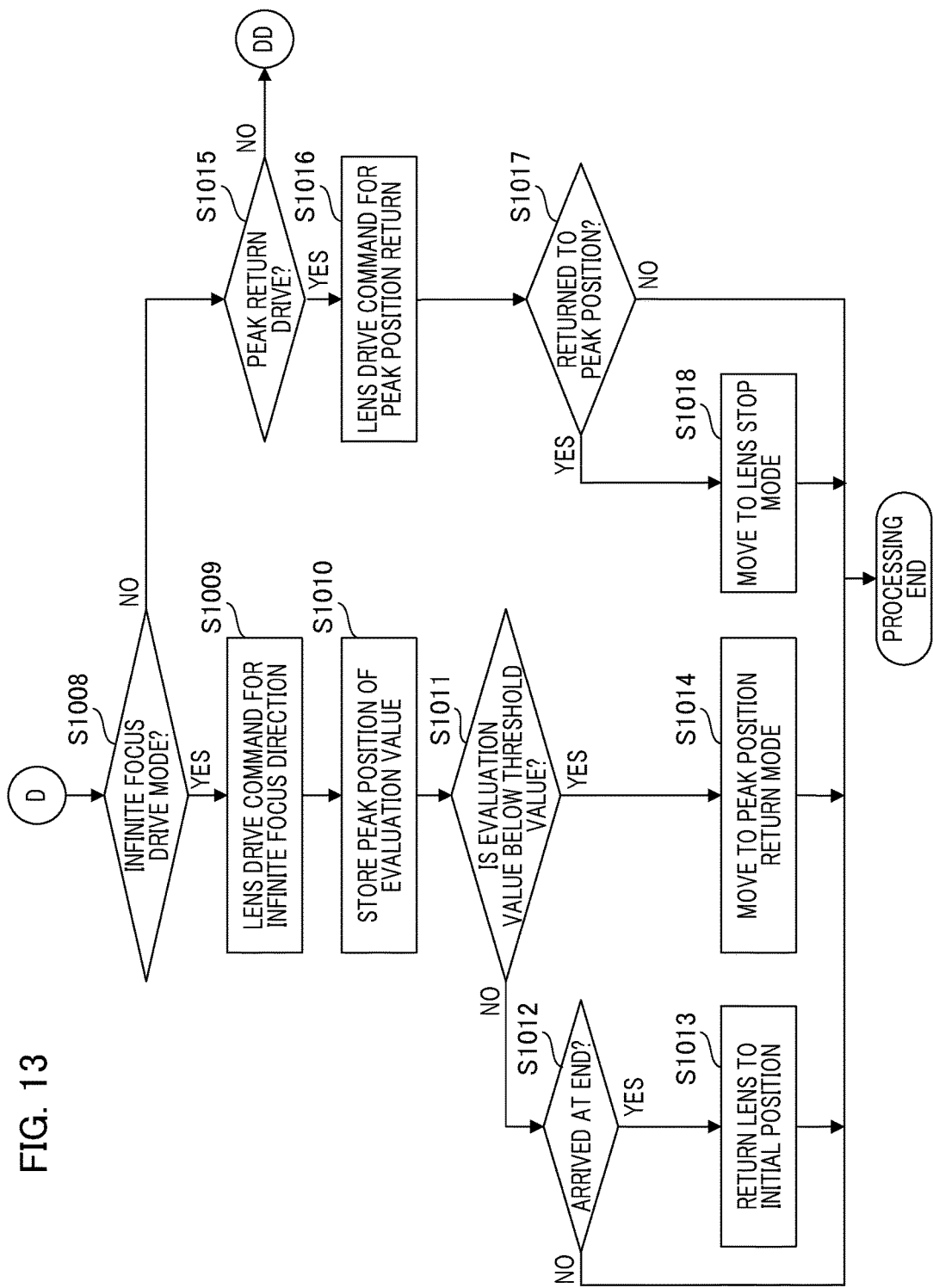
FIG. 13 is a flowchart for explaining processing subsequent to FIG. 12.

In S1008 of FIG. 13, it is determined whether or not the drive mode of the focus lens 10 is the infinite focus drive mode. In the case that the drive mode is the infinite focus drive mode, the processing advances to S1009, and otherwise, the processing transfers to S1015. S1009 is a process in which a lens drive command is sent to the lens control unit 8, and the drive command is set that drives the lens toward the infinite focus direction, and the processing advances to S1010. In S1010, the camera control unit 12 obtains data for the evaluation values according to the sharpness of the captured image from the AF evaluation value calculating unit 11, and retains the data for this evaluation value of the peak and the lens position at this time is stored, and the processing moves to S1011.

In S1011, it is determined whether or not the current evaluation value has fallen below the evaluation value of the peak that was stored in S1004. In the case in which a decrease in the evaluation value is confirmed to be equal to or greater than a threshold value, it is determined that the peak has been exceeded, and the processing moves to S1014. In the case in which the difference between the evaluation value of the peak that was stored in S1004 and the current evaluation value is less than a threshold, the processing moves to S1012. In S1012, it is determined whether or not the focus lens 10 has arrived at the end of the range of possible movement. In the case in which the focus lens 10 has arrived at the end, the processing advances to S1013 in order to stop the drive, and otherwise, the processing is ended.

In S1013, it is determined that the peak of the evaluation value was not in either the infinite focus direction or the near focus direction, and after control is carried out in which the focus lens 10 is returned to the initial position (refer to S1001 in FIG. 12) at which the AF start instruction was started, the processing is ended. At this time, a warning display informing a user that the focused position cannot be determined is displayed on the screen of the display 21. Note that in this process, instead of returning the focus lens 10 to the initial position, the focus lens 10 may be moved to a predetermined position.

In S1014, because the peak of the evaluation value has been detected, the camera control unit 12 sets the drive mode to a peak position return mode in order to carry out processing that returns to the peak position. S1015 is a determination process that determines whether or not the drive mode is the peak position return mode. In the case in which the drive mode is the peak position return mode, the processing advances to S1016, and in the case in which the drive mode is not the peak position return mode, the processing transfers to S1019 in FIG. 14.

In S1016, the camera control unit 12 sets the lens position at the peak that has been stored in S1010 to the target position, and carries out drive control of the focus lens 10. In S1017, it is determined whether or not the focus lens 10 has arrived at the peak position, and in the case in which the focus lens 10 has arrived at the peak position, the processing moves to S1018, and otherwise, the processing is ended. In S1018, the camera control unit 12 sets the drive mode to lens stop mode in order to carry out the stop processing for the focus lens 10.

Figure 14:
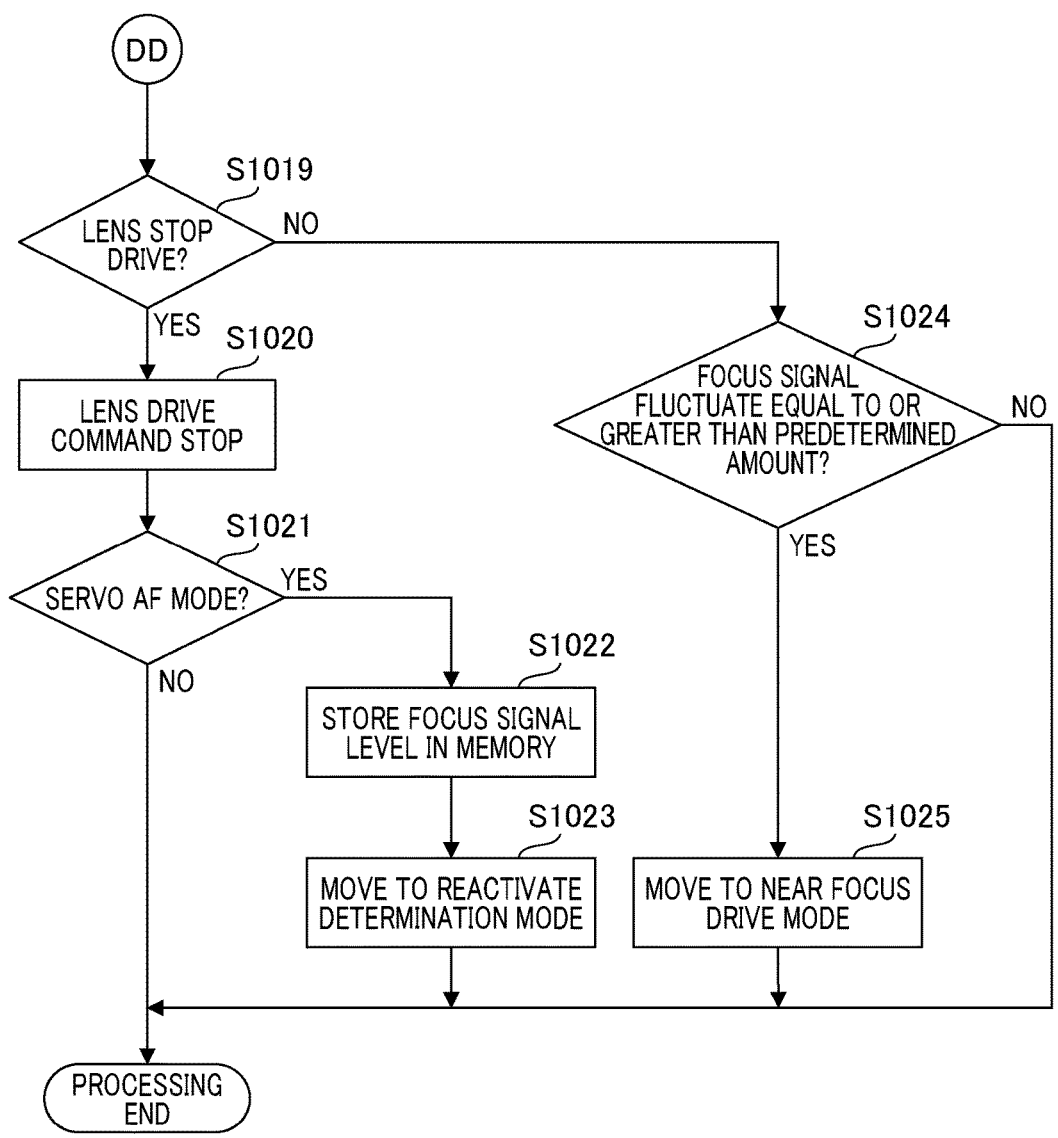
FIG. 14 is a flowchart for explaining processing subsequent to FIG. 13.

In S1019 of FIG. 14, it is determined whether or not the drive mode is the lens stop mode. In the case in which the drive mode is the lens stop mode, the processing moves to S1020, and in the case in which the drive mode is not the lens stop mode, the processing moves to S1024. S1020 is a process in which a drive stop command for the focus lens 10 is transmitted to the lens control unit 8. The focus lens 10 arrives at the focus position, and after the settings for the transmission of a stop command and the turning OFF of the power source of the focus motor 4 and the like are carried out, the processing moves to S1021. At this time, a display that informs the user that a focused state has been attained is carried out on the screen of the display 21.

S1021 is a determination process that determines whether or not the AF mode that has been set is a servo AF mode. As a result of the determination, in the case in which the AF mode is the servo AF mode, the processing advances to S1022, and in the case in which the AF mode is not the servo AF mode, the processing is ended.

In S1022, after the camera control unit 12 stores the focus signal level during focusing in memory, the processing advances to S1023, and moves to the reactivation determination mode. In S1024, the camera control unit 12 compares the current focus signal level and the focus signal level that was stored in memory in S1022, calculates a fluctuation amount based on the difference between both levels, and determines whether or not the fluctuation amount is equal to or greater than a predetermined value (threshold). In the case in which it has been determined that the fluctuation amount is equal to or greater than a threshold, the processing advances to S1025, and moves to the near focus drive mode. In the case in which the fluctuation amount is less than a threshold, the processing ends and returns to S1001, and the reactivation determination mode continues. Specifically, in the case in which the servo AF mode is set as the AF mode, even if the subject was in focus temporarily, the fluctuation of the AF evaluation value is monitored. In the case in which a fluctuation in the AF evaluation value has been detected, because there is a high probability that there has been a change in the subject, the processing moves to the reactivation determination mode. By repeating this focus action, focus adjust control that tracks the subject is carried out.

In the first embodiment, optimal focus adjustment control can be realized by changing to a communication processing method that is suitable for video shooting or still image shooting according to the AF start instruction. Specifically, during video shooting or live view display, because the action timing of the lens must be strictly managed, communication is carried out in a first communication mode in which fixed length data is periodically communicated by using a reference signal. In contrast, during still image shooting, because of prioritizing focusing that is as quick as possible in order to make the release time short, communication is carried out in a second communication mode in which the camera can request obtaining data at a necessary timing. In addition, according to the present embodiment, costs can be restrained because switching according to shooting mode is unnecessary due to providing a plurality of communication units in the camera main body and the lens apparatus.

Second Embodiment

Below, a second embodiment of the present invention will be explained. Note that the point of difference between the second embodiment and the first embodiment lies mainly in the detection processing of the focus adjustment state and the AF control processing. Thus, in the second embodiment, by using reference numerals that have already been used for structural components that are identical to those of the first embodiment, the detailed explanation thereof has been omitted, and the point of difference is explained. The method for such explanation is also identical in the embodiment described below.

The camera main body 2 that is shown in FIG. 1 is provided with a defocus amount calculating unit 14 that calculates the defocus amount. The defocus amount calculating unit 14 calculates the defocus amount based on a signal obtained by the imaging element 13 and outputs the result to the camera control unit 12, that is, the defocus amount calculating unit 14 uses what is referred to as an imaging plane phase difference detection method. In the image plane phase difference detection method, in a portion of the light receiving elements that form an imaging element 13, a pupil division function is provided by decentering the sensitivity window of the light receiving portion with respect to the optical axis of the on-chip micro-lenses, and the light receiving portion is used as focus detection pixels. In addition, a method has also been proposed in which, in a portion of the light receiving elements that form an imaging element 13, a pupil dividing function is applied by dividing the light receiving portion into two parts. The phase difference focus detection is carried out by using a plurality of the light receiving elements as focus detection pixels and positioning them between imaging pixel groups. Because the locations at which the focus detecting pixels are disposed correspond to a missing portion of the imaging pixels, image information is generated by interpolation processing by using the pixel information of the nearby imaging plane. The defocus amount calculating unit 14 detects a phase difference by carrying out correlation calculations of pairs of image signals that have been generated by a plurality of light receiving elements, and calculates the defocus amount based on the detection results.

The camera main body 2 of the present embodiment includes two AF methods, that is, a first method (defocus amount detecting method) that uses the defocus amount that has been obtained from the imaging element 13 and a second method (contrast AF method) that uses a contrast evaluation value for the captured image. In the defocus amount detecting method, the AF operation is executed based on the defocus amount that has been obtained from the defocus amount calculating unit 14. In contrast, in the contrast AF method, the AF operation is carried out by detecting the contrasts in the subject image that has been captured by the imaging element 13. For example, the defocus amount detecting method is used mainly in during still image shooting, the contrast AF method is used mainly during video shooting, and the camera control unit 12 carries out control by suitably changing the focus adjustment by using the plurality of AF methods.

Figure 15:
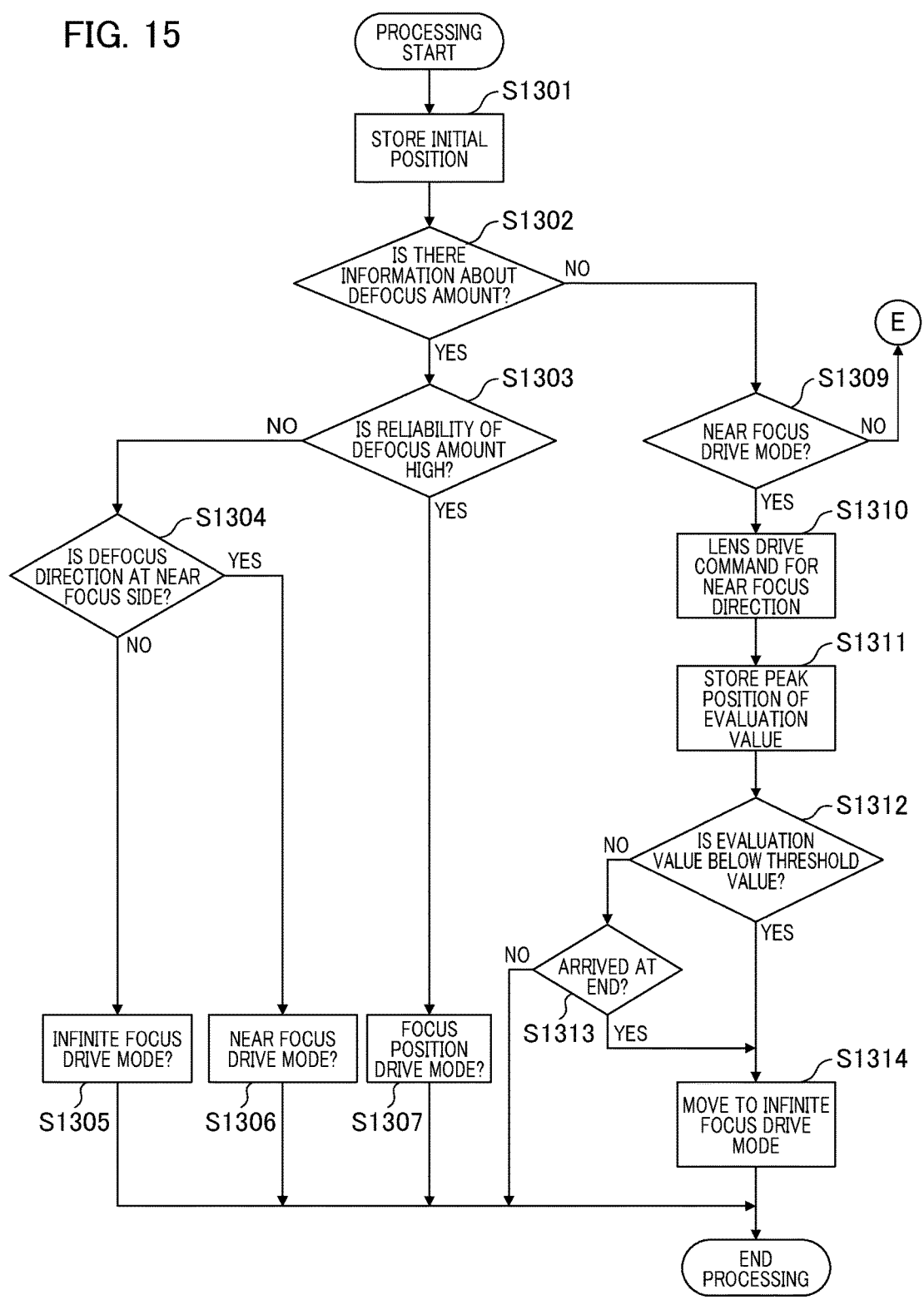
FIG. 15 is a flowchart for explaining an example of control of a focus adjustment action that uses defocus amount in a second embodiment of the present invention.

Next, referring to the flowcharts in FIG. 15 and FIG. 16, an example of the control of the focus adjustment action will be explained. In the processing in FIG. 4, which was explained in the first embodiment, the camera control unit 12 receives an AF start instruction due to a user operation, and in S510, in the case in which one shot control has started, the processing transfers to S1301 in FIG. 15.

In S1301, the camera control unit 12 stores the initial position of the focus lens 10 at the AF start time in memory. In S1302, the presence or absence of information about the defocus amount is determined. In the case in which it has been determined that there is information about the defocus amount obtained from the defocus amount calculating unit 14, the processing advances to S1303, and in the case in which there is no information, the processing transfers to S1309. In S1303, the camera control unit 12 determines whether or not the reliability of the information about the defocus amount is high. As an evaluation method of the reliability, an S level (SELECTLEVEL) value and the like that is disclosed in Japanese Patent Laid-Open No. 2007-052072 (refer to paragraphs 0082 and 0144 and the like) is used. In the case in which the reliability of the information is higher than a threshold value, in order to determine the focused position by using this defocus amount, the processing advances to S1307, and after the focus position drive mode has been set as the drive mode, the processing is ended.

In S1303, in the case in which it has been determined that the reliability of the defocus amount is lower than a threshold value, the processing moves to S1304, and the camera control unit 12 determines a direction by which the focused position is obtained by using only information that indicates the defocus direction. In the case in which the defocus direction is the near focus side, the processing advances to S1306, and after the near focus drive mode has been set as the drive mode, the processing is ended. In contrast, in the case in which the direction of defocus is the infinite focus direction, the processing advances to S1305, and after the infinite focus drive mode has been set as the drive mode, the processing is ended. The explanation of the processing from S1309 to 1327 is omitted because this processing is identical to the case of FIG. 12 and FIG. 13.

Figure 16:
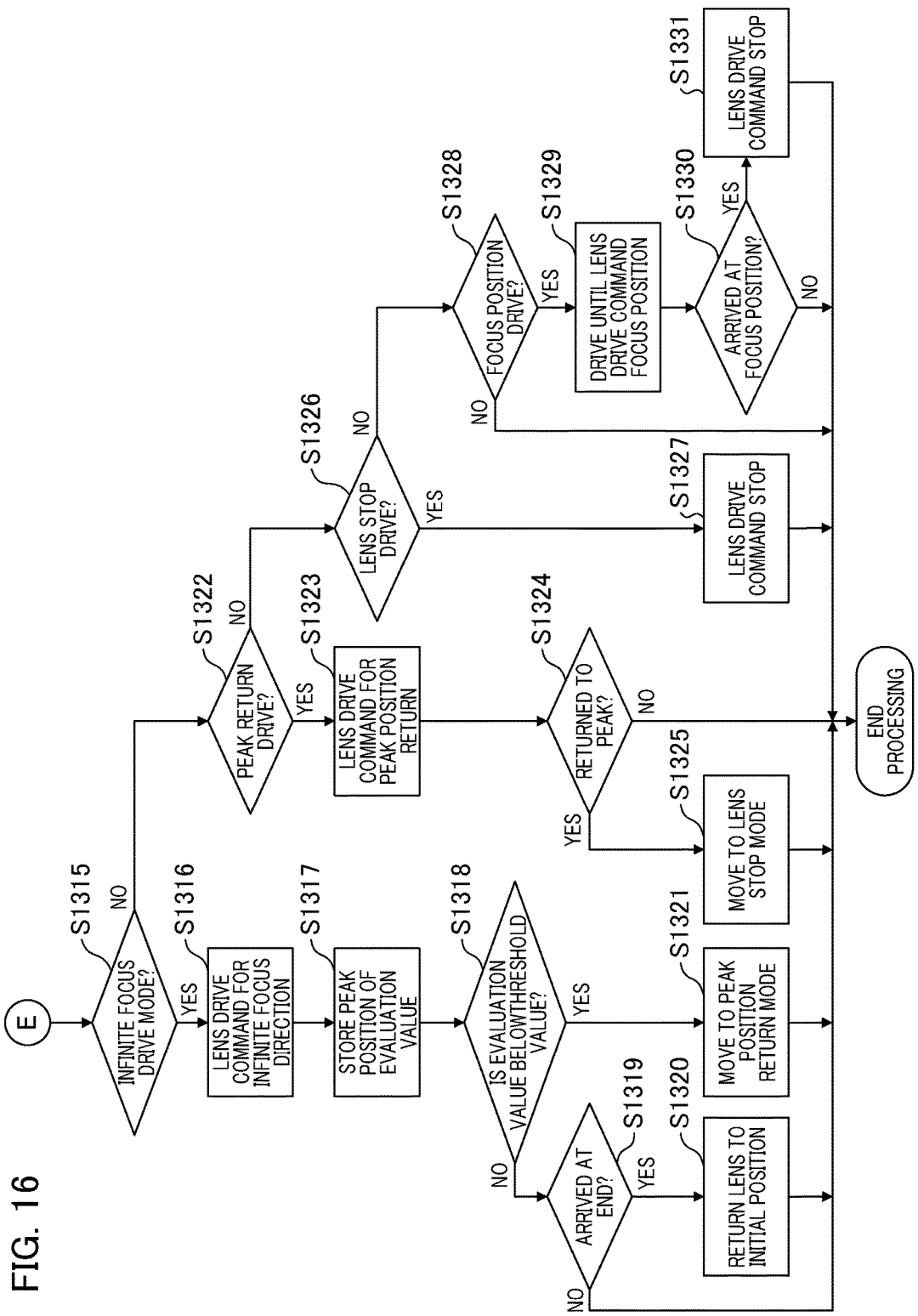
FIG. 16 is a flowchart for explaining the processing subsequent to FIG. 15.

S1328 in FIG. 16 is determination processing that determines whether or not the drive mode is the focus position drive mode. In the case that the drive mode is the focus position drive mode, the processing advances to S1329, and in the case in which the drive mode is not the focus position drive mode, the processing is ended. In S1329, the camera control unit 12 carries out control in which the focus lens 10 is driven toward the focus position that has been calculated based on the defocus amount, and the processing advances to S1330. S1330 is determination processing that determines whether or not the focus lens 10 has arrived at the focus position. In the case in which the focus lens 10 has arrived at the focus position, the processing moves to S1331, and after the drive mode has been set to the lens stop mode, the processing is ended. In addition, in the case in which the focus lens 10 has not arrived at the focus position, the processing is ended as-is.

In the second embodiment, an AF start instruction is received due to a user operation, and a focus adjustment action is carried out according to the defocus amount detecting method and the contrast AF method. In the present embodiment as well, suitable focus adjustment control can be realized by changing to a communication processing method that is suitable for video shooting and still image shooting.

Third Embodiment

Figure 17:
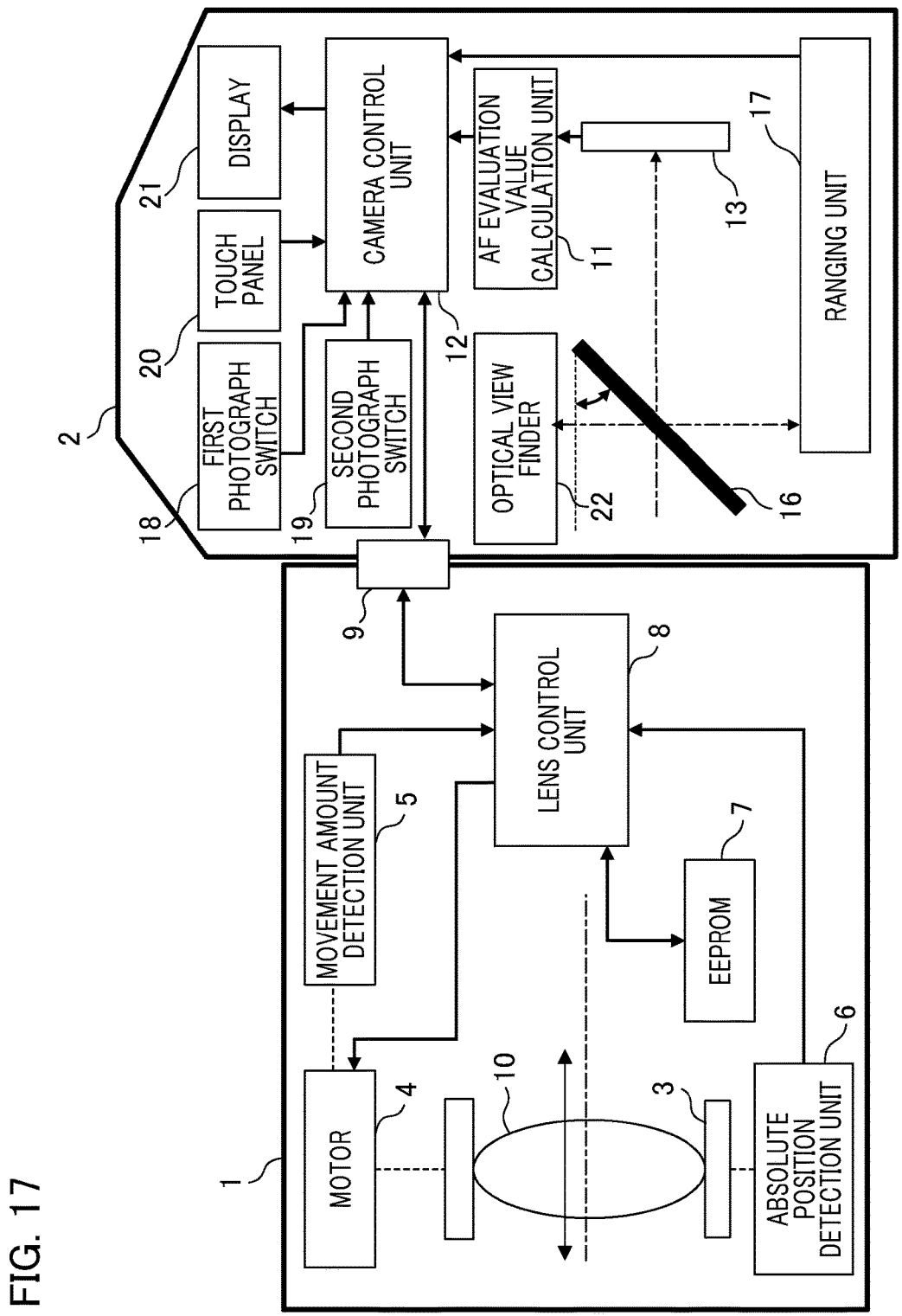
FIG. 17 is a block diagram that shows an example of a configuration of a camera main body and an interchangeable lens unit according to a third embodiment of the present invention.

Next, a third embodiment of the present invention will be explained. Referring to FIG. 17, an example of a configuration of the camera main body according to the third embodiment will be explained. In the present embodiment, a half mirror 16 is added as a movable mirror member. The half mirror 16 has the role of separating the incident light that has passed through the interchangeable lens 1 and causing the incident light to arrive at a ranging unit 17. In a state in which the half mirror 16 is positioned on the optical axis by being lowered by a drive mechanism (not illustrated), the light arrives at the ranging unit 17 and the optical view finder 22, and attains a state that is referred to as an optical view finder mode. In contrast, in a state in which the half mirror 16 is raised so as to retract from the optical axis, the light from the subject arrives at the imaging element 13. Thus, a user can photograph while viewing the image that has been captured on the display screen of the display 21, and attain a state referred to as the live view mode.

The ranging unit 17 is a device that obtains distance information by measuring the deviation amount of the image plane in the current position of the focus unit 3 corresponding to the distance from the camera to the subject. Generally, in an autofocussing camera, a focus deviation detection method that uses a plurality of line sensors is employed. In this case, the phase difference is detected by carrying out a correlation calculation of pairs of image signals that have been generated by the line sensors, and the defocus amount are calculated based on the detected result. Note that other examples of ranging methods include a method that carries out triangulation ranging by using an infrared light emitting device (ILED), and the ranging method used in the present embodiment is not limited in particular.

The camera body 2 in the present embodiment is provided with two AF methods, specifically, a phase difference detecting method and a contrast AF method. The phase difference detecting method functions mainly in the case in which still image shooting is carried out, and the AF action is executed based on detected data that has been detected by the ranging unit 17. In contrast, the contrast AF method functions mainly in the case in which video shooting is carried out, and the AF action is carried out by detecting the contrasts of the subject image that have been captured by the imaging element 13. The camera control unit 12 controls the focus adjustment action while suitably changing the AF action by each of the methods.

Figure 18:
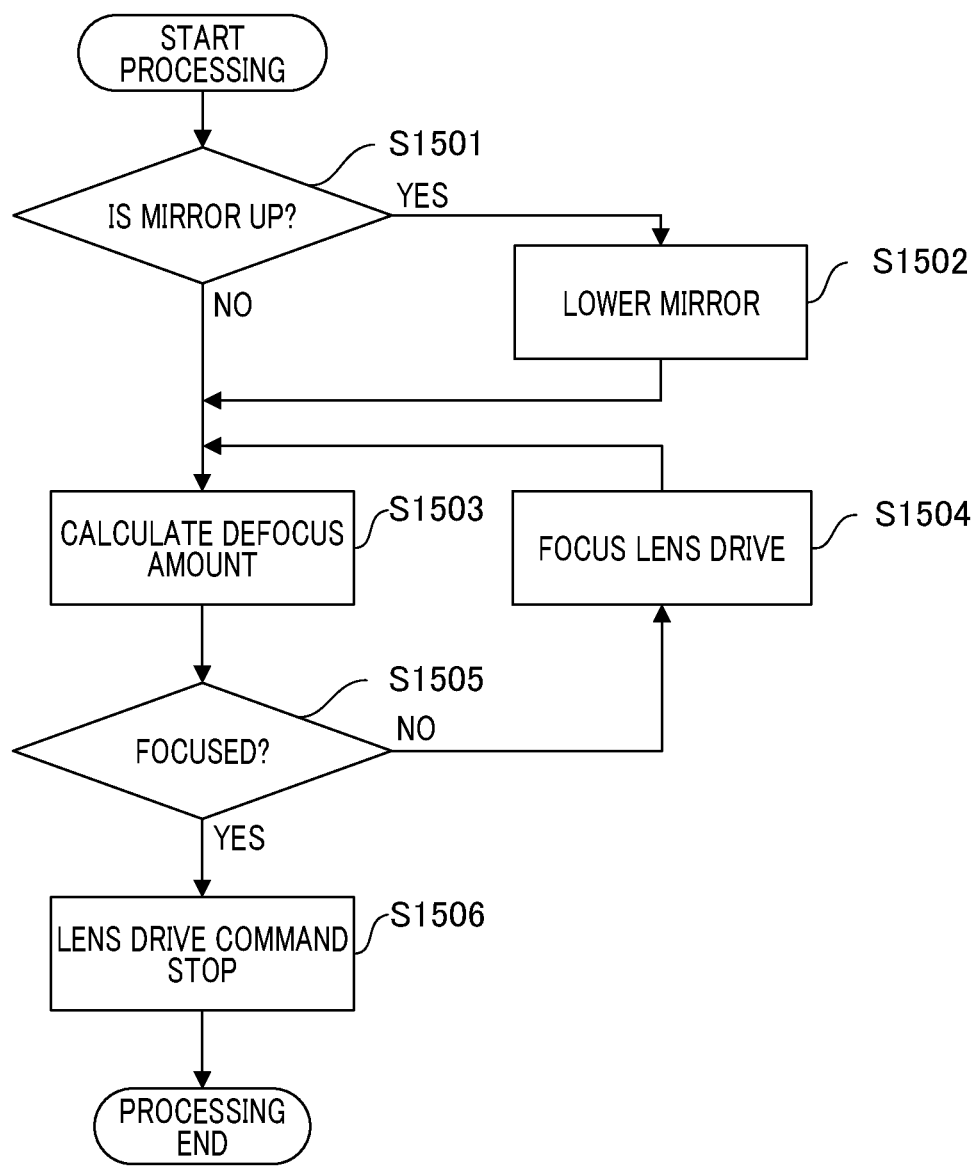
FIG. 18 is a flowchart for explaining an example of drive control in a third embodiment of the present invention.

Next, an example of the focus adjustment control will be explained with reference to the flowchart in FIG. 18. In the processing in FIG. 4, which was explained in the first embodiment, the camera control unit 12 receives an AF start instruction due to a user operation, and in S510, in the case in which one shot control has been started, the processing transfers to S1501 in FIG. 18.

In S1501, the camera control unit 12 determines the state of the half mirror 16. In the case in which the half mirror 16 is in a raised state and retracted from the optical axis, the processing transfers go S1502, and in the case in which the half mirror 16 is in a lowered state and positioned on the optical axis, the processing advances to S1503. In S1502, the camera control unit 12 carries out processing that lowers the half mirror in order to carry out ranging processing by using the ranging unit 17. By this processing, because the half mirror 16 is positioned on the optical axis, the live view mode is suspended, the mode is changed to the optical view finder mode, and a state is attained in which the subject can be observed by using the optical view finder 22. Then, the processing advances to S1503.

In S1503, the camera control unit 12 obtains information from the line sensors that form the ranging unit 17 and calculates the defocus amount. S1505 is a determination process that determines whether or not the defocus amount that has been calculated in S1503 are equal to or less than a permitted value (threshold value). In the case in which the defocus amount are equal to or less than the permitted value, the camera control unit 12 determines not to be in focus, the processing advances to S1504, and drive control of the focus lens 10 is carried out. Subsequently, until the determined result is a focused state, the processing from S1503 to S1505 is repeatedly executed. In addition, in S1505, in the case in which the defocus amount becomes less than a permitted value and it has been determined that a focused state has been attained, the processing advances to S1506. In S1506, the camera control unit 12 transmits a drive stop command for the focus lens 10 to the lens control unit 8. At this time, a display that notifies the user that a focused state has been attained is carried out on the display screen of the display 21.

In the third embodiment, an AF start instruction is received due to a user operation, and a focus adjustment action that corresponds to a phase difference detecting method and a contrast AF method is carried out. At this time, by switching between a first communication mode (mainly for video shooting) and a second communication mode (mainly for still image shooting), a smooth focus adjustment action can be carried out for both still image shooting and video shooting.

Note that in each of the embodiments described above, communication processing between a camera control unit 12 and a lens control unit 8 was explained to exemplify drive control of a focus lens that serves as an optical member in a lens apparatus. This is not limiting, and the present invention can be applied to drive control for an optical member for a shake correcting lens and the like.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-128472 filed Jun. 6, 2012 and Japanese Patent Application No. 2012-207842 filed Sep. 21, 2012, which are hereby incorporated by reference herein in their entirety.

What is claimed is:

1. An image capturing apparatus capable of interchanging a lens unit comprising:
    an imaging element configured to capture the image by accumulating charge generated by photoelectrically converting light flux that passes through an imaging optical system including a focusing lens; and
    at least one processor or one circuitry which function as:
    a control unit configured to control communication with the lens unit,
    wherein the control unit is configured to change from a first communication method to a second communication method, when a predetermined operation instructing a focus adjustment for capture of still image is performed by the user,
    wherein the first communication method includes a predetermined periodical communication of a first communication and a second communication,
    wherein the second communication method does not include the predetermined periodical communication, and
    wherein the control unit is further configured to change from the second communication method to the first communication method, when the predetermined operation and an operation instructing capture of still image is released by the user, while operating in the second communication method.

2. The image capturing apparatus according to claim 1, wherein the control unit is configured to transmit an instruction of a focus adjustment for capturing still image to the lens unit by the second communication method.

3. The image capturing apparatus according to claim 1, wherein the control unit is configured to control a focus detection based on the data received from the lens unit by the first communication, and transmit an instruction based on the result of the focus detection to the lens unit by the second communication.

4. The image capturing apparatus according to claim 1, wherein the control unit is configured to control the communication with the lens unit by the second communication method while the predetermined operation is performed by a user.

5. The image capturing apparatus according to claim 1, wherein the control unit is configured to change communication method from the second communication method to the first communication method, after the capture of the still image.

6. The image capturing apparatus according to claim 1, wherein the control unit is configured to instruct the lens unit so as to perform a wobbling action of the focusing lens, as focus adjustment when communicating with the lens unit by the first communication method, and is configured to instruct the lens unit so as to perform an action of the focusing lens different from the wobbling action as focus adjustment when communicating with the lens unit by the second communication method.

7. The image capturing apparatus according to claim 2, wherein the first communication is a communication corresponding to a reference signal, and
    wherein the second communication is performed after the first communication synchronized with the reference signal, before the next first communication.

8. The image capturing apparatus according to claim 7, wherein the reference signal is a vertical synchronization signal.

9. The image capturing apparatus according to claim 7, wherein the communication by the second communication method is performed independent timing from the reference signal.

10. The image capturing apparatus according to claim 7, wherein the first communication and the second communication are communications with respective fixed length.

11. The image capturing apparatus according to claim 7, further comprising:
    a switch member configured to be operated in a first state or a second state by a user; and
    wherein the predetermined operation is the operation of the switch member to the first state,
    wherein when the switch member is operated to the second state by the user, the control unit controls so as to capture the still image,
    wherein the control unit is configured to control the communication with the lens unit by the first communication method when the switch member is in either of the first state and the second state, and
    wherein the control unit is configured to control the communication with the lens unit in the second communication method until the first state and the second state are both released.

12. A lens unit attachable to an image capturing apparatus, comprising:
    an imaging optical system including a focusing lens; and
    at least one processor or one circuitry which function as:

a control unit configured to control communication with the camera, wherein the control unit is configured to change from a first communication method to a second communication method, when a predetermined operation instructing a focus adjustment for capture of still image is performed by the user, wherein the first communication method includes a predetermined periodical communication of a first communication and a second communication, wherein the second communication method does not include the predetermined periodical communication, and wherein the control unit is further configured to change from the second communication method to the first communication method, when the predetermined operation and an operation instructing capture of still image is released by the user, while operating in the second communication method.

13. The lens unit according to claim 12,
wherein the control unit is configured to control the focus adjustment according to an instruction received from the camera by the second communication method.

14. The lens unit according to claim 12,
wherein the control unit is configured to transmit data including an information indicating a position of the focusing lens by the first communication, and configured to receive the instruction based on the result of the focus detection by the second communication.

15. The lens unit according to claim 12,
wherein the control unit is configured to control the communication with the image capturing apparatus by the second communication method while the predetermined operation is performed by a user.

16. The lens unit according to claim 12,
wherein the control unit is configured to change communication method from the second communication method to the first communication method, after the capture of the still image.

17. The lens unit according to claim 12,
wherein the control unit is configured to perform a wobbling action as focus adjustment when communicating with the image capturing apparatus by the first communication method, and is configured perform an action of the focusing lens different from the wobbling action as focus adjustment when communicating with the image capturing apparatus by the second communication method.

18. The image capturing apparatus according to claim 14,
wherein the first communication is a communication corresponding to a reference signal, and
wherein the second communication is performed after the first communication synchronized with the reference signal, before the next first communication.

19. The image capturing apparatus according to claim 18,
wherein the reference signal is a vertical synchronization signal.

20. The image capturing apparatus according to claim 18,
wherein the communication by the second communication method is performed at independent timing from the reference signal.

21. The lens unit according to claim 18,
wherein the first communication and the second communication are communications with respective fixed length.

22. A control method that is executed by an image capturing apparatus capable of interchanging a lens unit that includes an imaging element configured to capture the image by accumulating charge generated by photoelectrically converting light flux that passes through an imaging optical system including a focusing lens, the method comprising:

controlling communication with the lens unit,
wherein, in the controlling, a communication method is changed from a first communication method to a second communication mode, when a predetermined operation instructing a focus adjustment for capture of still image is performed by the user, wherein the first communication method includes a predetermined periodical communication of a first communication and a second communication, wherein the second communication method does not include the predetermined periodical communication, and wherein, in the controlling, the communication method is changed from the second communication method to the first communication method, when the predetermined operation and an operation instructing capture of still image is released by the user, while operating in the second communication method.

23. A control method that is executed by a lens unit attachable to an image capturing apparatus that includes an imaging optical system including a focusing lens, the method comprising:

controlling communication with the camera,
wherein, in the controlling, a communication method is changed from a first communication method to a second communication method, when a predetermined operation instructing a focus adjustment for capture of still image is performed by the user, wherein the first communication method includes a predetermined periodical communication of a first communication and a second communication, wherein the second communication method does not include the predetermined periodical communication, and wherein, in the controlling, the communication method is changed from the second communication method to the first communication method, when the predetermined operation and an operation instructing capture of still image is released by the user, while operating in the second communication method.

24. A non-transitory storage medium on which is stored a computer program for making a computer execute a method for controlling an image capturing apparatus capable of interchanging a lens unit that includes an imaging element configured to capture the image by accumulating charge generated by photoelectrically converting light flux that passes through an imaging optical system including a focusing lens, the method comprising:

controlling communication with the lens unit,
wherein, in the controlling, a communication method is changed from a first communication method to a second communication mode, when a predetermined operation instructing a focus adjustment for capture of still image is performed by the user, wherein the first communication method includes a predetermined periodical communication of a first communication and a second communication, wherein the second communication method does not include the predetermined periodical communication, and wherein, in the controlling, the communication method is changed from the second communication method to the first communication method, when the predetermined operation and an operation instructing capture of still image is released by the user, while operating in the second communication method.

25. A non-transitory storage medium on which is stored a computer program for making a computer execute a method for controlling a lens unit attachable to an image capturing apparatus that includes an imaging optical system including a focusing lens, the method comprising:

controlling communication with the camera, wherein, in the controlling, a communication method is changed from a first communication method to a second communication method, when a predetermined operation instructing a focus adjustment for capture of still image is performed by the user, wherein the first communication method includes a predetermined periodical communication of a first communication and a second communication, wherein the second communication method does not include the predetermined periodical communication, and wherein, in the controlling, the communication method is changed from the second communication method to the first communication method, when the predetermined operation and an operation instructing capture of still image is released by the user, while operating in the second communication method.

* * * * *